United States Patent
Nishiwaki

(10) Patent No.: US 9,787,972 B2
(45) Date of Patent: Oct. 10, 2017

(54) IMAGE DISPLAY DEVICE

(71) Applicant: PANASONIC INTELLECTUAL PROPERTY MANAGEMENT CO., LTD., Osaka (JP)

(72) Inventor: Seiji Nishiwaki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 408 days.

(21) Appl. No.: 14/489,534

(22) Filed: Sep. 18, 2014

(65) Prior Publication Data
US 2015/0092027 A1    Apr. 2, 2015

(30) Foreign Application Priority Data
Sep. 27, 2013  (JP) .................................. 2013-202742

(51) Int. Cl.
H04N 13/04    (2006.01)
G02B 27/22    (2006.01)

(52) U.S. Cl.
CPC ....... H04N 13/0406 (2013.01); G02B 27/225 (2013.01)

(58) Field of Classification Search
CPC .......................... G02B 27/225; H04N 13/0406
USPC ........................................................ 348/54
See application file for complete search history.

(56) References Cited

U.S. PATENT DOCUMENTS

| | | | |
|---|---|---|---|
| 5,838,494 A | 11/1998 | Araki | |
| 5,991,073 A * | 11/1999 | Woodgate | G02B 27/225 348/E13.004 |
| 7,834,903 B2 * | 11/2010 | Saishu | H04N 13/0404 348/42 |
| 2002/0008674 A1 * | 1/2002 | Son | G09G 3/003 345/4 |
| 2003/0052836 A1 * | 3/2003 | Matsumoto | G02B 27/2214 345/6 |
| 2004/0085643 A1 | 5/2004 | Ishikawa et al. | |
| 2004/0150583 A1 * | 8/2004 | Fukushima | H04N 13/0409 345/6 |
| 2005/0156813 A1 | 7/2005 | Adachi et al. | |
| 2006/0050016 A1 | 3/2006 | Tomisawa et al. | |
| 2006/0209066 A1 | 9/2006 | Kubara et al. | |
| 2007/0109505 A1 | 5/2007 | Kubara et al. | |
| 2008/0291269 A1 | 11/2008 | Hong et al. | |

(Continued)

FOREIGN PATENT DOCUMENTS

| | | |
|---|---|---|
| JP | 08-194273 | 7/1996 |
| JP | 10-333093 | 12/1998 |

(Continued)

*Primary Examiner* — Nguyen Truong

(74) *Attorney, Agent, or Firm* — McDermott Will & Emery LLP

(57) ABSTRACT

An image display device includes a display including a plurality of light emitting elements that are two-dimensionally arranged, the plurality of light emitting elements being divided into a plurality of division regions, each of which includes more than one of the plurality of light emitting elements; and a lens that is located near a surface of the display so as to correspond to the division regions and that forms a display image by focusing each of images displayed in the respective division regions as a real image or a virtual image so that the focused images overlap on a same image plane.

14 Claims, 23 Drawing Sheets

(56) References Cited

U.S. PATENT DOCUMENTS

| | | | |
|---|---|---|---|
| 2009/0168167 A1* | 7/2009 | Hiroya | G02B 27/2214 359/477 |
| 2009/0322741 A1* | 12/2009 | Ito | G02B 27/2214 345/419 |
| 2010/0194866 A1* | 8/2010 | Komiya | H04N 13/0418 348/54 |
| 2010/0265465 A1 | 10/2010 | Kubara et al. | |
| 2011/0018860 A1* | 1/2011 | Parry-Jones | G09G 3/20 345/214 |
| 2012/0062988 A1* | 3/2012 | Watanabe | G02B 27/225 359/462 |
| 2012/0154697 A1* | 6/2012 | Van Der Horst | G02B 27/225 349/15 |
| 2013/0027525 A1* | 1/2013 | Kitayama | G02B 27/2264 348/54 |
| 2013/0162780 A1 | 6/2013 | Kurahashi | |
| 2014/0118647 A1* | 5/2014 | Momonoi | G02B 27/2214 349/33 |

FOREIGN PATENT DOCUMENTS

| | | |
|---|---|---|
| JP | 2004-085965 | 3/2004 |
| JP | 2004-144873 | 5/2004 |
| JP | 2004-144874 | 5/2004 |
| JP | 2004-151645 | 5/2004 |
| JP | 2004-294848 | 10/2004 |
| JP | 2005-181914 | 7/2005 |
| JP | 2006-259058 | 9/2006 |
| JP | 2006-267767 | 10/2006 |
| JP | 2007-101929 | 4/2007 |
| JP | 2010-160362 | 7/2010 |
| JP | 2010-230984 | 10/2010 |
| JP | 2011-034086 | 2/2011 |
| JP | 2013-106265 | 5/2013 |
| WO | 2012/039346 | 3/2012 |

* cited by examiner

IMAGE DISPLAY DEVICE

This application claims priority to Japanese Patent Application No. 2013-202742, filed on Sep. 27, 2013, the contents of which are hereby incorporated by reference.

BACKGROUND

1. Technical Field

The present disclosure relates to an image display device.

2. Description of the Related Art

Humans are capable of recognizing images three dimensionally through, for example, (1) focusing of crystalline lenses, (2) parallax between both eyes, which is a difference in how things look between left and right eyes, and (3) convergence of both eyes, which is movement of the eyes to make the lines of sight of the eyes intersect. In general, displays of game devices, TV sets, etc., have a two-dimensional display surface. Although images displayed on the display surface are two-dimensional, it is possible to make users recognize the two-dimensional images as three-dimensional images by utilizing the effects of the above-mentioned items (1) to (3). Displays including lenticular lenses, which have been commercialized, are an example of displays using the effects of the above-mentioned items (2) and (3).

Referring to FIG. 22, Japanese Unexamined Patent Application Publication No. 8-194273 discloses an image display device including lenticular lenses. A two-dimensional light emitting unit 21, such as a liquid crystal display, includes many pixels 21P. Each pixel 21P is divided into two regions, which are a region 21R and a region 21L. Lenticular lenses 20 are arranged on a surface of the light emitting unit 21 in one-to-one correspondence with the pixels 21P.

Owing to the focusing effect of each lenticular lens 20, light emitted from the region 21R of the corresponding pixel 21P is focused at a focusing point 4R, and light emitted from the region 21L of the corresponding pixel 21P is focused at a focusing point 4L. When the right and left eyes of a viewer are placed at the focusing points 4R and 4L, and different images are displayed on the regions 21R and 21L in consideration of the parallax, the viewer recognizes a three-dimensional image owing to the effects of the above-mentioned items (2) and (3). In other words, the right eye receives only an image formed by light emitted from the regions 21R, and the left eye receives only an image formed by light emitted from the regions 21L.

These two images are based on parallax information that corresponds to the parallax between both eyes. When the left and right eyes both look at the surface of the light emitting unit 21, the lines of sight intersect, in other words, convergence of both eyes occurs.

SUMMARY

With image display devices according to the related art, there have been demands for further reduction in size.

Accordingly, an embodiment of the present disclosure provides an image display device whose size can be reduced.

An image display device according to an aspect of the present disclosure includes a display including a plurality of light emitting elements that are two-dimensionally arranged, the plurality of light emitting elements being divided into a plurality of division regions, each of which includes more than one of the plurality of light emitting elements; and a lens that is located near a surface of the display so as to correspond to the division regions and that forms a display image by focusing each of images displayed in the respective division regions as a real image or a virtual image so that the focused images overlap on a same image plane.

This comprehensive or specific aspect may be realized by a system, a method, an integrated circuit, a computer program, or a recording medium, or by any combination of a system, an apparatus, a method, an integrated circuit, a computer program, and a recording medium.

According to the aspect of the present disclosure, the image display device can be reduced in size.

Additional benefits and advantages of the disclosed embodiments will be apparent from the specification and Figures. The benefits and/or advantages may be individually provided by the various embodiments and features of the specification and Figures, and need not all be provided in order to obtain one or more of the same.

DETAILED DESCRIPTION

Figure 1:
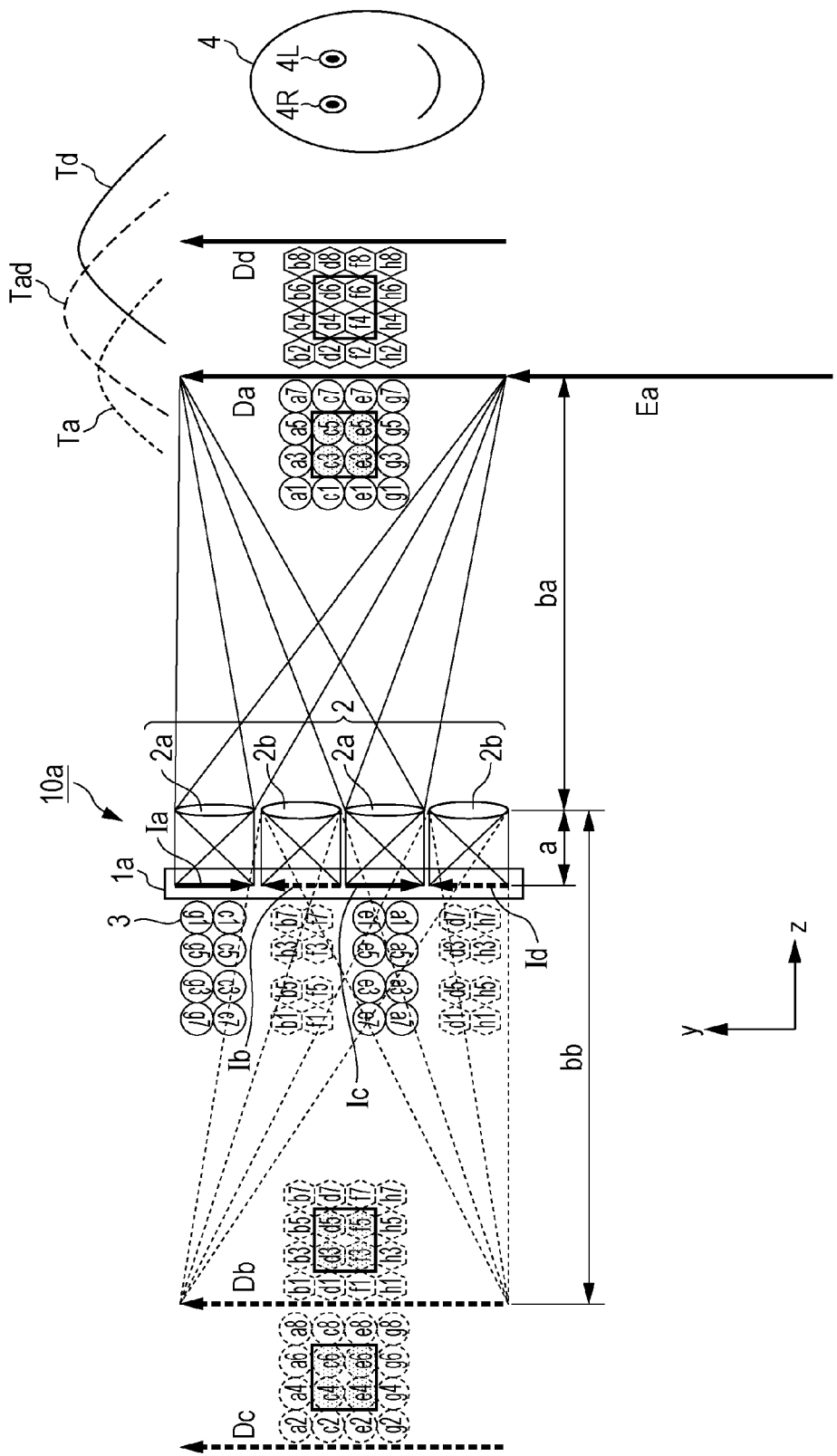
FIG. 1 is a sectional view schematically illustrating the structure of an image display device according to a first embodiment, the positional relationship between a display, a lens, and display images, and optical paths.

According to the image display device described in Japanese Unexamined Patent Application Publication No. 8-194273, the focusing points of the eyes of a user 4 are on a surface of the light emitting unit 21. In contrast, the intersection of the lines of sight is at the position of a three-dimensional image, and is shifted from the surface of the light emitting unit 21. In other words, in principle, the position at which the focusing points of the crystalline lenses are adjusted differs from the position at which the lines of sight of both eyes intersect. Therefore, the user experiences high visual stress.

A first aspect of the present disclosure provides an image display device including a display including a plurality of light emitting elements that are two-dimensionally arranged, the plurality of light emitting elements being divided into a plurality of division regions, each of which includes more than one of the plurality of light emitting elements; and a lens that is located near a surface of the display so as to correspond to the division regions and that forms a display image by focusing each of images displayed in the respective division regions as a real image or a virtual image so that the focused images overlap on a same image plane.

In the image display device according to the first aspect, since the display is divided into a plurality of division regions, the division regions are smaller than the display. With the image display device according to the first aspect, the lens is arranged so as to correspond to the division regions. Therefore, the focal length of the lens can be reduced in accordance with the size of the division regions. As a result, according to the first aspect, the image display device can be reduced in size.

In addition, according to the first aspect, a user recognizes an image by adjusting the focusing points of the crystalline lenses. Therefore, a natural image with which visual stress experienced by the user can be reduced can be displayed. According to the first aspect, the visual stress experienced by the user when the user recognizes, for example, a three-dimensional image can be reduced compared to that in the case in which a method according to the related art is used.

According to a second aspect of the present disclosure, in the image display device according to the first aspect, the plurality of division regions display the respective images so that the images displayed in the respective division regions interpolate each other to form the display image.

According to the second aspect, since the images displayed in the respective division regions interpolate each other to form the display image, a high-resolution display image can be formed.

According to a third aspect of the present disclosure, in the image display device according to the second aspect, each of the plurality of division regions displays an image obtained by partially thinning out the display image.

According to the third aspect, a high-resolution display image can be formed by interpolating the images displayed in the respective division regions in accordance with a certain rule.

According to a fourth aspect of the present disclosure, in the image display device according to the first aspect, the display includes a plurality of division region groups, each of which includes more than one of the plurality of division regions, the images displayed in the division regions that belong to a same division region group being focused by the lens so as to overlap on the same image plane and form the display image. The lens includes a plurality of individual lenses that are arranged so as to correspond to the respective division region groups, and the individual lenses corresponding to the respective division region groups have different focal lengths or are located at different distances from the display so that the display images corresponding to the respective division region groups are formed at different positions in a thickness direction of the display.

According to the fourth aspect, the display images can be formed at different positions in the thickness direction of the display, that is, in the front-back direction of the image display device. Accordingly, the user recognizes a three-dimensional image by adjusting the focusing points of the crystalline lenses, and a natural image with which visual stress experienced by the user can be reduced can be displayed. According to the fourth aspect, the visual stress experienced by the user when the user recognizes a three-dimensional image can be reduced compared to that in the case in which a method according to the related art is used.

According to the fifth aspect of the present disclosure, in the image display device according to the fourth aspect, the individual lenses are arranged so that the display images corresponding to the respective division region groups and formed by the respective individual lenses overlap if moved in the thickness direction of the display, and light emission states of the light emitting elements that correspond to a region in which the display images overlap if moved in the thickness direction of the display are associated with each other.

According to the fifth aspect, when, for example, the light emitting elements for forming the display images at the front are turned on, the light emitting elements for forming the display images at positions behind the display images at the front can be turned off. Thus, reduction in visibility of the display images at the front due to the display images at the back can be prevented.

According to a sixth aspect of the present disclosure, in the image display device according to the first aspect, the display includes a basic region including the plurality of division regions, and when a distance between the display and the lens is Ra and a distance between the display image and the lens is Rb, Rb/Ra is determined so that an area of the display image is substantially equal to an area of the basic region.

According to the sixth aspect, the area of the basic region including the division regions that form the display image is substantially equal to the area of the display image. Therefore, the display image formed by the division regions included in the basic region can be connected to a display image formed by division regions included in a basic region adjacent to the basic region.

According to a seventh aspect of the present disclosure, in the image display device according to the first aspect, the display includes a liquid crystal layer that is disposed between the lens and the images displayed in the respective division regions and that has a refractive index that varies in response to a voltage applied to the liquid crystal layer.

According to the seventh aspect, an optical distance between the lens and the images displayed in the respective division regions can be changed by applying a voltage to the liquid crystal layer and changing the refractive index of the liquid crystal layer.

According to an eighth aspect of the present disclosure, in the image display device according to the first aspect, the display includes a plurality of color filters having different colors, and one of the color filters having a single color is arranged in each division region.

According to the eighth aspect, light that is emitted from a light source of each light emitting element at an angle easily passes through a color filter having a single color. Therefore, light extraction efficiency can be increased.

According to a ninth aspect of the present disclosure, in the image display device according to the first aspect, the display includes a transparent protective substrate arranged at a forefront of the display, and the image display device further comprises convex lenses arranged so as to be in contact with the protective substrate and correspond to the respective division regions.

According to the ninth aspect, light from a light source of each light emitting element that is otherwise totally reflected by a surface of the protective substrate can be extracted to the outside. Therefore, light extraction efficiency can be increased. In addition, since convex lenses having a relatively large diameter that matches the size of the division regions are formed, defects caused by misalignment between the light sources of the light emitting elements and the convex lenses can be reduced.

According to a tenth aspect of the present disclosure, in the image display device according to the first aspect, the display includes a transparent portion disposed between two of the division regions that are adjacent to each other, the transparent portion allowing light to pass therethrough in a thickness direction of the display.

According to the tenth aspect, the user can visually recognize not only the display image but also the sight of a region behind the display.

According to an eleventh aspect of the present disclosure, the image display device according to the first aspect further includes a camera disposed between two of the division regions that are adjacent to each other and a light shielding wall disposed behind the camera. The plurality of division regions display images for allowing the lens to display an image captured by the camera as the display image.

According to the eleventh aspect, an image of a region in front of the image display device that has been captured by the camera can be displayed as the display image.

A twelfth aspect of the present disclosure provides an image display device including a display including a plurality of light emitting elements that are two-dimensionally arranged, the plurality of light emitting elements being divided into a plurality of division regions, each of which includes more than one of the plurality of light emitting elements; and lenses that are located near a surface of the display so as to correspond to the respective division regions, each lens forming a display image for the corresponding division region by focusing an image displayed in the corresponding division region as a real image or a virtual image. The lenses corresponding to the respective division regions have different focal lengths or are located at different distances from the display so that the display images corresponding to the respective division regions are at different positions in a thickness direction of the display.

According to the twelfth aspect, the display images can be formed at different positions in the thickness direction of the display, that is, in the front-back direction of the image display device.

In the image display device according to the twelfth aspect, since the display is divided into a plurality of division regions, the division regions are smaller than the display. With the image display device according to the twelfth aspect, the lens is arranged so as to correspond to the division regions. Therefore, the focal length of the lens can be reduced in accordance with the size of the division regions. As a result, according to the twelfth aspect, the image display device can be reduced in size.

Embodiments of the present disclosure will now be described with reference to the drawings. The following description relates to an example of the present disclosure, and the present disclosure is not limited to the following description.

First Embodiment

Figure 2:
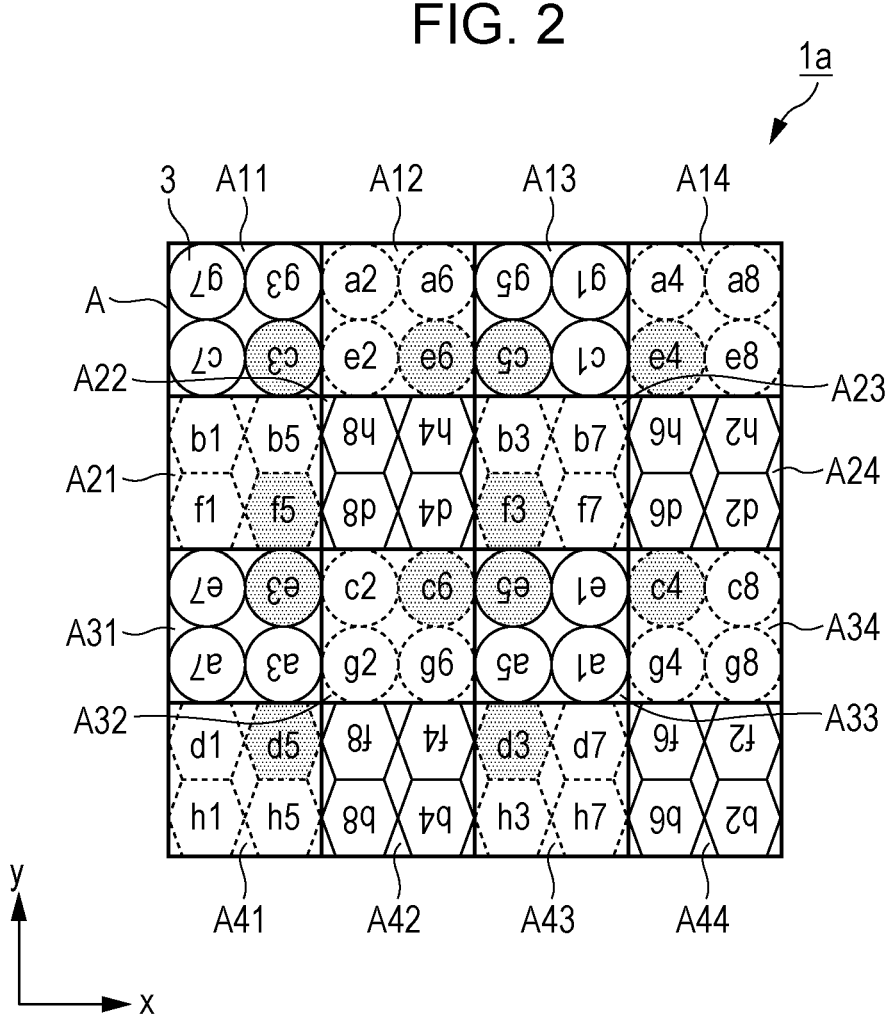
FIG. 2 schematically illustrates an arrangement of light emitting elements included in the display according to the first embodiment.

As illustrated in FIG. 1, an image display device 10a according to a first embodiment includes a display 1a and a lens 2. The display 1a is, for example, a liquid crystal display or an organic EL display. As illustrated in FIG. 2, the display 1a includes a plurality of light emitting elements 3 that are two-dimensionally arranged. In the present embodiment, the light emitting elements 3 are arranged in eight columns in an x direction and eight rows in a y direction, and 64 light emitting elements 3 are provided in total. The thus-arranged 64 light emitting elements 3 form a basic region A. The basic region A covers a part or the entirety of a display surface of the display 1a on which an image is displayed. Each light emitting element 3 is a pixel, a color pixel, or a collection of color pixels having the same shape in the display 1a. In the accompanying drawings, an xy plane is a plane parallel to the display surface of the display 1a, and a positive y-axis direction is an upward direction of the display 1a or the image display device 10a. A z axis is orthogonal to the xy plane, and an z-axis direction corresponds to a thickness direction of the display 1a or a front-back direction of the image display device 10a. A positive z-axis direction corresponds to a forward direction of the image display device 10a.

The basic region A in which the light emitting elements 3 are two-dimensionally arranged is divided into a division region A11, a division region A12, . . . , and a division region A44, each of which includes a plurality of light emitting elements 3. Each division region includes four light emitting elements 3 in total which are arranged in two columns in the x direction and two rows in the y direction. The number of light emitting elements 3 included in each division region is not particularly limited. The basic region A is divided into 16 division regions that are arranged in four columns in the x direction and four rows in the y direction. The number of division regions included in the basic region A is not particularly limited.

The 16 division regions individually display images by emitting light from the light emitting elements 3. The display 1a includes a plurality of division region groups, each of which includes a plurality of division regions. More specifically, the display 1a includes a division region group Gr1, a division region group Gr2, a division region group Gr3, and a division region group Gr4. The division region group Gr1 includes the division region A11, the division region A13, the division region A31, and the division region A33. The division region group Gr2 includes the division region A21, the division region A23, the division region A41, and the division region A43. The division region group Gr3 includes the division region A12, the division region A14, the division region A32, and the division region A34. The division region group Gr4 includes the division region A22, the division region A24, the division region A42, and the division region A 44.

The lens 2 is disposed near a surface of the display 1a so as to correspond to the division regions. The lens 2 includes first individual lenses 2a, second individual lenses 2b, third individual lenses (not shown), and fourth individual lenses (not shown) which are arranged so as to correspond to the division region groups Gr1, Gr2, Gr3, and Gr4, respectively. The first individual lenses 2a are arranged so as to correspond to the division regions A11, A13, A31, and A33, which belong to the division region group Gr1. The second individual lenses 2b are arranged so as to correspond to the division regions A21, A23, A41, and A43, which belong to the division region group Gr2. The third individual lenses are arranged so as to correspond to the division regions A12, A14, A32, and A34, which belong to the division region group Gr3. The fourth individual lenses are arranged so as to correspond to the division regions A22, A24, A42, and A44, which belong to the division region group Gr4.

The first individual lenses 2a, the second individual lenses 2b, the third individual lenses, and the fourth individual lenses have different focal lengths. The focal lengths of the first individual lenses 2a, the second individual lenses 2b, the third individual lenses, and the fourth individual lenses are fa, fb, fc, and fd, respectively. When the distance between each individual lens and the display 1a is a, the first individual lenses 2a, the second individual lenses 2b, the third individual lenses, and the fourth individual lenses satisfy fa<a, fb>a, fc>a, and fd<a, respectively. Each first individual lens 2a focuses an image displayed in the division region at which the first individual lens 2a is disposed, for example, the division region A11, as a real image at a position separated from the first individual lens 2a by a distance ba determined by Equation (1) given below. Each second individual lens 2b focuses an image displayed in the division region at which the second individual lens 2b is disposed, for example, the division region A21, as a virtual image at a position separated from the second individual lens 2b by a distance bb determined by Equation (2) given below. Each third individual lens focuses an image displayed in the division region at which the third individual lens is disposed, for example, the division region A12, as a virtual image at a position separated from the third individual lens by a distance bc determined by Equation (3) given below. Each fourth individual lens focuses an image displayed in the division region at which the fourth individual lens is disposed, for example, the division region A22, as a real image at a position separated from the fourth individual lens by a distance bd determined Equation (4) given below.

$$ba = fa \times a / (a - fa) \tag{1}$$

$$bb = fb \times a / (fb - a) \tag{2}$$

$$bc = fc \times a / (fc - a) \tag{3}$$

$$bd = fd \times a / (a - fd) \tag{4}$$

The images displayed in the division regions A11, A13, A31, and A33, which belong to the division region group Gr1, are focused by the first individual lenses 2a as real images at a position in front of the display 1a and separated from the first individual lenses 2a by ba. The first individual lenses 2a focus the images displayed in the division regions A11, A13, A31, and A33 as the real images on the same image plane so that the images overlap. In other words, the relative positional relationship between the first individual lenses 2a and the division regions A11, A13, A31, and A33 is determined so that the first individual lenses 2a can cause the images displayed in the division regions A11, A13, A31, and A33 to overlap on the same image plane. For example, the positions of the images displayed in the division regions A11, A13, A31, and A33 are adjusted with respect to central axes of the respective first individual lenses 2a. Thus, the first individual lenses 2a form a display image Da.

Similarly, the second individual lenses 2b form a display image Db by focusing the images displayed in the division regions A21, A23, A41, and A43 as virtual images on the same image plane so that the images overlap. The third individual lenses form a display image Dc by focusing the images displayed in the division regions A12, A14, A32, and A34 as virtual images on the same image plane so that the images overlap. The fourth individual lenses form a display image Dd by focusing the images displayed in the division regions A22, A24, A42, and A44 as real images on the same image plane so that the images overlap.

As described above, the images displayed in the division regions that belong to the same division region group are caused to overlap on the same image plane by the lens to form a display image. The focal lengths fa, fb, fc, and fd of the first individual lenses 2a, the second individual lenses 2b, the third individual lenses, and the fourth individual lenses corresponding to the division region groups Gr1, Gr2, Gr3, and Gr4, respectively, are set to different values, so that the display images Da, Db, Dc, and Dd corresponding to the division region groups Gr1, Gr2, Gr3, and Gr4, respectively, are formed at different positions in the thickness direction of the display 1a (z direction). Therefore, the display images Dd, Da, Db, and Dc are arranged in the z axis direction in that order from a position closest to the user 4. Thus, the image display device 10a is capable of forming display images at different positions in the front-back direction thereof.

Since the first individual lenses 2a form the real images, an image Ia displayed in the division region A11, for example, is inverted when it is focused by the corresponding first individual lens 2a. In contrast, since the second individual lenses 2b form virtual images, an image Ib displayed in the division region A21, for example, is not inverted when it is focused by the corresponding second individual lens 2b. Accordingly, the image Ia is inverted in advance in the display 1a. Also in other division regions of the display 1a, images that are inverted in advance are displayed in the division regions for which the lens 2 forms real images. In the display 1a of the example illustrated in FIG. 1, an image Ic is inverted in advance and an image Id is not inverted in advance. In FIG. 2, inverted images are displayed in the division regions in which the symbols on the light emitting elements 3 are inverted.

Figure 3A:
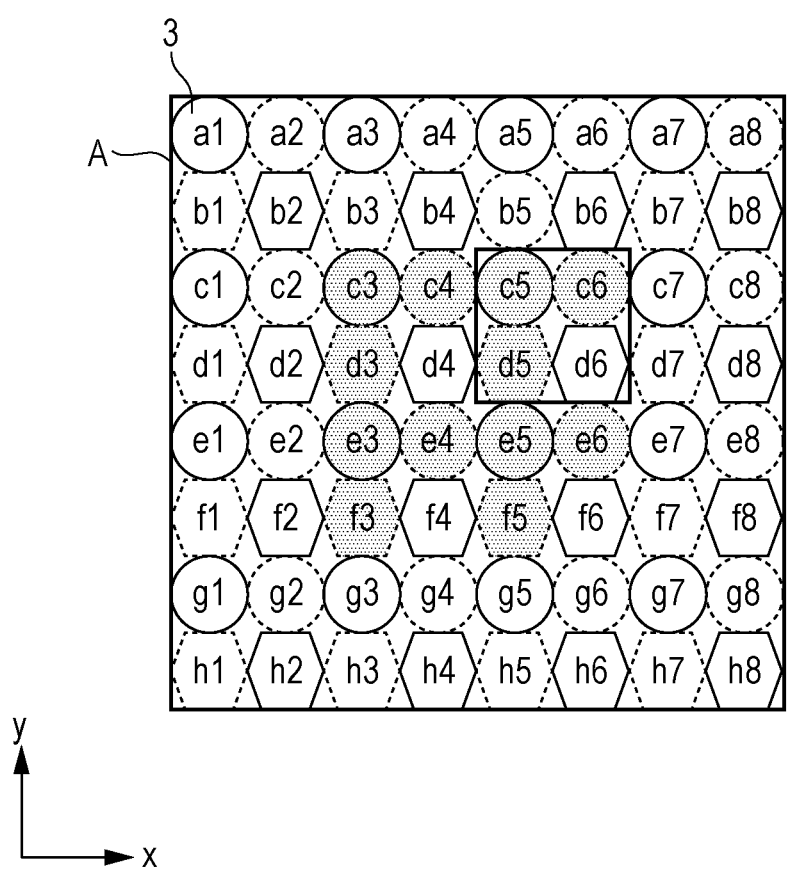
FIG. 3A illustrates an arrangement of the light emitting elements in a basic region A, the arrangement being the origin of the thought process that leads to the arrangement of the light emitting elements illustrated in FIG. 2.

Referring to FIGS. 2 and 3A to 3C, the thought process that leads to the arrangement of the light emitting elements 3 in the display 1a illustrated in FIG. 2 will be described. FIG. 3A illustrates an arrangement of the light emitting elements 3 in the basic region A, the arrangement being the origin of the thought process. The basic region A includes the light emitting elements 3 arranged in, for example, an 8×8 matrix pattern having eight rows (rows a to h) in the negative y-axis direction and eight columns (columns 1 to 8) in the positive x-axis direction. In FIG. 3A, the light emitting element 3 on the fourth row and sixth column from the upper left corner of the matrix of the light emitting elements 3, for example, is denoted by symbol d6. Other light emitting elements 3 are also denoted in a similar manner.

Figure 3B:
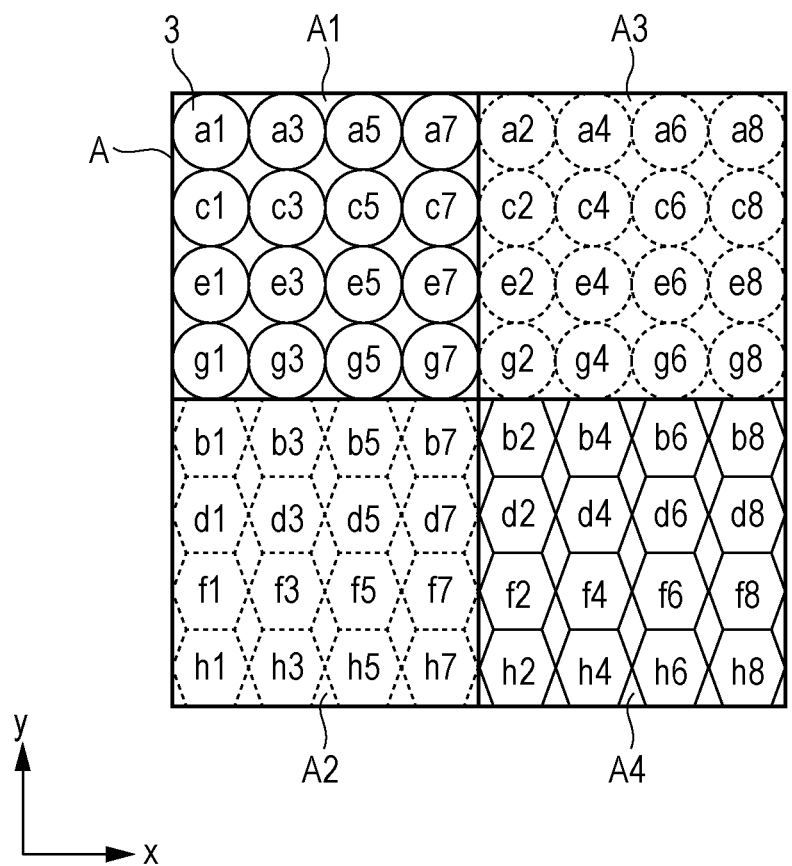
FIG. 3B illustrates the manner in which the basic region A is divided into four regions, which are a middle region A1, a middle region A2, a middle region A3, and a middle region A4.

As illustrated in FIG. 3B, the basic region A is divided into four regions, which are a middle region A1, a middle region A2, a middle region A3, and a middle region A4. At this time, the light emitting elements 3 are rearranged so that every other light emitting elements 3 are collected in the same middle region in both the x direction and y direction.

Figure 3C:
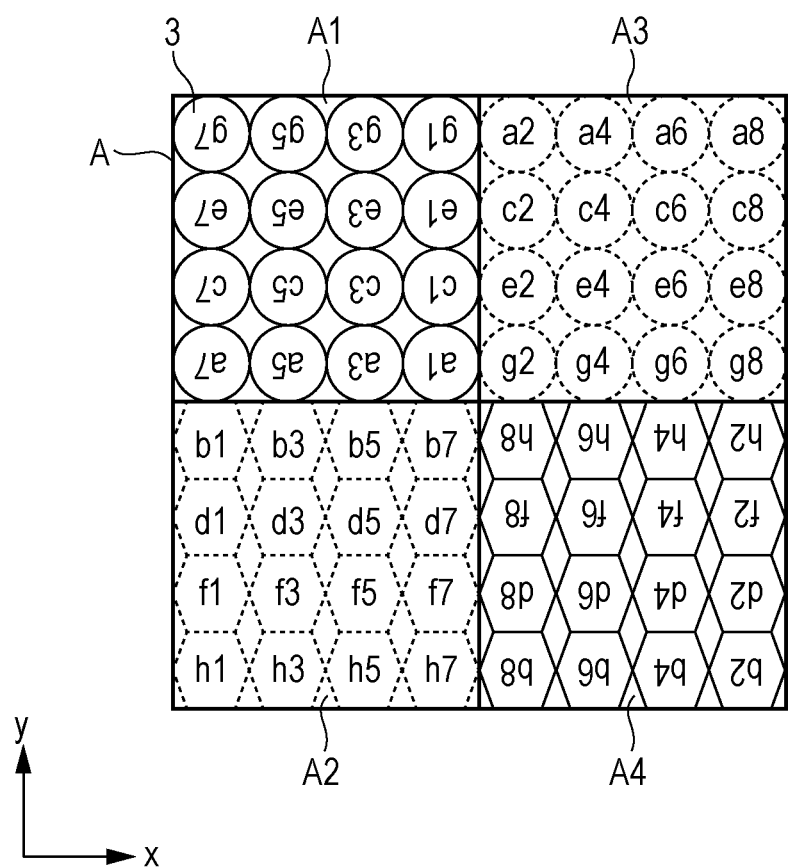
FIG. 3C illustrates the manner in which, among the middle regions A1, A2, A3, and A4, arrangements of the light emitting elements included in the middle regions A1 and A4 are inverted around the center axes of the middle regions A1 and A4.

Next, as illustrated in FIG. 3C, the light emitting elements 3 included in the middle regions A1 and A4 are inverted around the center axes of the middle regions A1 and A4 while the light emitting elements 3 in the middle regions A2 and A3 remain unchanged. In other words, the light emitting elements 3 included in the middle regions A1 and A4 are rearranged so that the light emitting elements 3 before the inversion are rotated by 180° around the axes that extend through the centers of the middle regions A1 and A4 and that are orthogonal to the xy plane. The inversion is performed in consideration of the inversion of the images that occurs when the images displayed in the division regions are focused by the lens 2 as real images.

Next, as illustrated in FIG. 2, the basic region A is divided into 16 division regions. At this time, the light emitting elements 3 included in the middle region A1 are arranged in the division regions A11, A13, A31, and A33 so that every other light emitting elements 3 are collected in the same division region in both the x direction and the y direction. The light emitting elements 3 included in the middle region A2 are arranged in the division regions A21, A23, A41, and A43 so that every other light emitting elements 3 are collected in the same division region in both the x direction and the y direction. The light emitting elements 3 included in the middle region A3 are arranged in the division regions A12, A14, A32, and A34 so that every other light emitting elements 3 are collected in the same division region in both the x direction and the y direction. The light emitting elements 3 included in the middle region A4 are arranged in the division regions A22, A24, A42, and A44 so that every other light emitting elements 3 are collected in the same division region in both the x direction and the y direction. The above-described process can be generalized as follows. That is, assuming that mx and my are natural numbers, the basic region A includes mx×my light emitting elements 3. In addition, assuming that nx and ny are divisors of mx and my, respectively, the basic region A is divided into nx×ny division regions. In the example of FIG. 2, mx=my=8 and nx=ny=4. At this time, the division regions that belong to the same division region group are arranged so as to have mx/nx−1 division regions disposed therebetween in the x direction and my/ny−1 division regions disposed therebetween in the y direction. Here, it is not necessary that the division regions be arranged according to this rule. Then, the light emitting elements 3 are rearranged in the corresponding division regions so that every two light emitting elements 3 having nx−1 light emitting elements 3 therebetween in the x direction and every two light emitting elements 3 having ny−1 light emitting elements 3 therebetween in the y direction are collected in the same division region.

The arrangement of the light emitting elements 3 in the display 1a is determined by the above-described process. The light emitting elements 3 that belong to the middle region A1 are the same as the light emitting elements 3 that belong to the division region group Gr1. The light emitting elements 3 that belong to the middle region A2 are the same as the light emitting elements 3 that belong to the division region group Gr2. The light emitting elements 3 that belong to the middle region A3 are the same as the light emitting elements 3 that belong to the division region group Gr3. The light emitting elements 3 that belong to the middle region A4 are the same as the light emitting elements 3 that belong to the division region group Gr4.

The division regions A11, A13, A31, and A33 that belong to the division region group Gr1 display respective images so that the images interpolate each other to form the display image Da. For example, the division regions A11, A13, A31, and A33 display images obtained by discretely thinning out the display image Da. The resolution of each of the images displayed in the division regions A11, A13, A31, and A33 is low. However, the images displayed in the respective division regions interpolate each other, so that a high-resolution image Da can be displayed. More specifically, the display image Da is formed such that an image formed by a light emitting element 3 that belongs to the division region A13, for example, is inserted between images formed by light emitting elements 3 that belong to the division region A11 and that are adjacent to each other. Images displayed in the division regions that belong to the other division region groups also interpolate each other to form the respective display images.

Figure 4A:
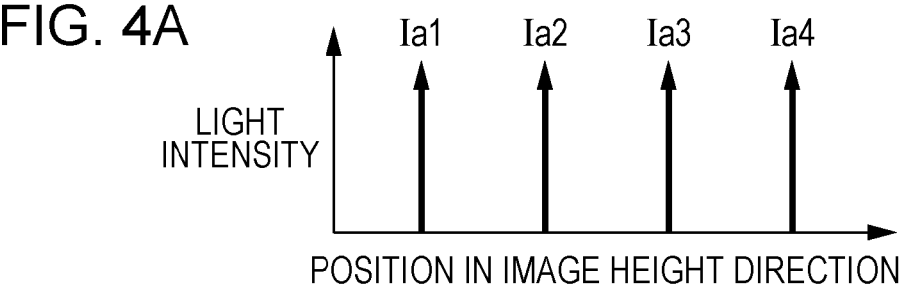
FIG. 4A schematically illustrates imaging locations of light emitting elements that belong to a certain division region in the image display device according to the first embodiment.
Figure 4B:
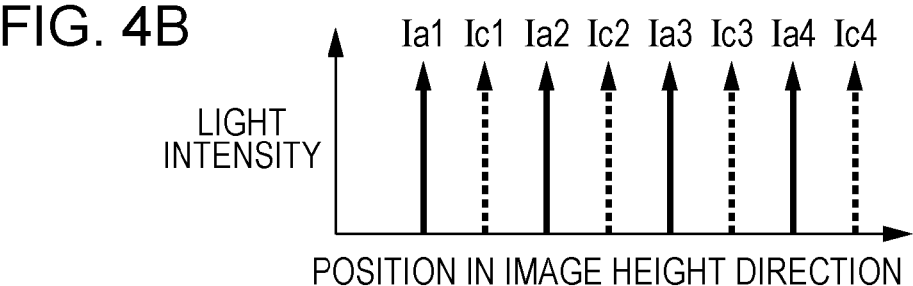
FIG. 4B schematically illustrates imaging locations of light emitting elements that belong to another division region in the image display device according to the first embodiment.

Here, it is assumed that the light emitting elements 3 are point light sources, and the horizontal and vertical axes respectively represent the position in an image height direction (y direction or x direction) and the light intensity. In this case, the imaging state of an image displayed by the light emitting elements 3 that belong to a specific division region, for example, the division region A11, can be expressed as shown by solid arrows Ia1, Ia2, Ia3, and Ia4 in FIG. 4A. Also, the imaging state of an image displayed by the light emitting elements 3 that belong to another division region, for example, the division region A13, A31, or A33, can be expressed as shown by dashed arrows Ic1, Ic2, Ic3, and Ic4 in FIG. 4B. As illustrated in FIG. 4B, the solid arrows Ia1, Ia2, Ia3, and Ia4 are interpolated by the dashed arrows Ic1, Ic2, and Ic3 inserted therebetween. The dashed arrows Ic1, Ic2, and Ic3 may be arranged at midpoints between the solid arrows Ia1, Ia2, Ia3, and Ia4 or points where the regions between the solid arrows Ia1, Ia2, Ia3, and Ia4 are evenly divided. Alternatively, the dashed arrows Ic1, Ic2, and Ic3 may be shifted from the midpoints between the solid arrows Ia1, Ia2, Ia3, and Ia4 and points where the regions between the solid arrows Ia1, Ia2, Ia3, and Ia4 are evenly divided. In the case where the dashed arrows Ic1, Ic2, and Ic3 are shifted from the midpoints between the solid arrows Ia1, Ia2, Ia3, and Ia4 and points where the regions between the solid arrows Ia1, Ia2, Ia3, and Ia4 are evenly divided, when the display image Da has a periodic pattern, generation of moire pattern can be suppressed.

Figure 4C:
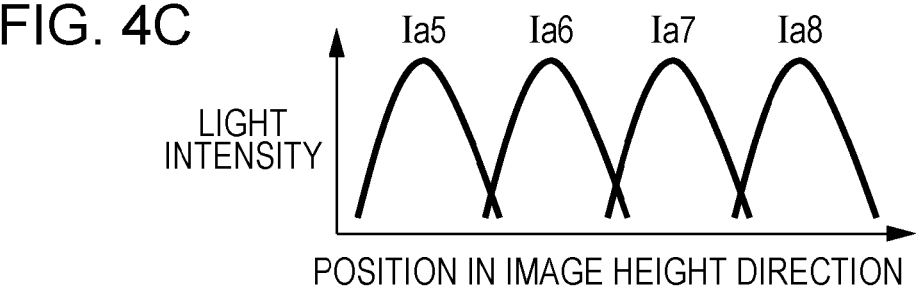
FIG. 4C illustrates imaging locations of light emitting elements that belong to a certain division region in the image display device according to the first embodiment.
Figure 4D:
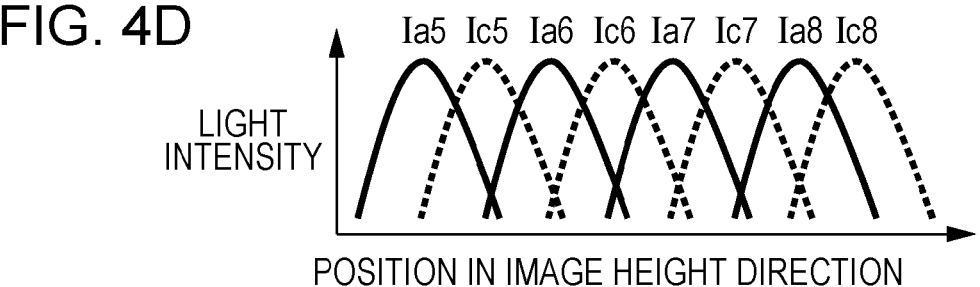
FIG. 4D illustrates imaging locations of light emitting elements that belong to another division region in the image display device according to the first embodiment.

In practice, the light emitting elements 3 have a certain size and the lens 2 has aberrations. Therefore, the imaging state of the image displayed by the light emitting elements 3 that belong to a specific division region is expressed as shown by solid curves Ia5, Ia6, Ia7, and Ia8 in FIG. 4C. In addition, the imaging state of the image displayed by the light emitting elements 3 that belong to another division region is expressed as shown by dashed curves Ic5, Ic6, Ic7, and Ic8 in FIG. 4D. As illustrated in FIG. 4D, the solid curves Ia5, Ia6, Ia7, and Ia8 are interpolated by the dashed curves Ic5, Ic6, and Ic7 inserted therebetween. Thus, a high-resolution display image can be formed. For example, in the case where the spot size of point images is smaller than the interpolation interval, which is the distance between Ic5 and Ic6, the resolution can be effectively increased when the images displayed in the respective division regions interpolate each other to form the display image. In this case, the diameter of the spot within which the light intensity is 80% of the maximum light intensity may be smaller than the interpolation interval. Even when the diameter of the spot within which the light intensity is 80% of the maximum light intensity is greater than the interpolation interval, generation of moire pattern can be suppressed.

In practice, the pixels of the display 1a are separated from each other with a metal mask, and the area of each of R, G, and B light emitting pixels is one-third or less of the area of a color pixel. Therefore, even when one or more pixels are inserted between the pixels, the resolution can be effectively increased.

Figure 5A:
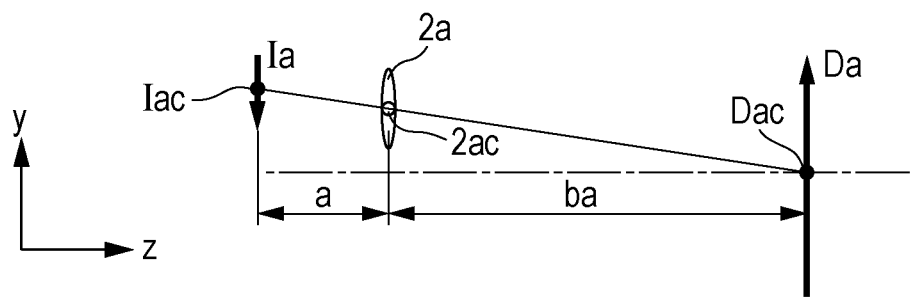
FIG. 5A illustrates the positional relationship between an image displayed in a division region, an individual lens, and a display image along an optical axis.

An example of adjustment of the positions of the images displayed in the division regions and the positions of the individual lenses will now be explained with reference to FIGS. 5A and 5B. FIG. 5A schematically illustrates the positional relationship between the first individual lens 2a that corresponds to the division region A11, the image Ia displayed in the division region A11, and the display image Da along the optical axis (z axis). The distance between the first individual lens 2a and the image Ia is defined as a, and the distance between the first individual lens 2a and the display image Da is defined as ba. On the basis of the lens formula, the relative positional relationship between the first individual lens 2a and the image Ia is determined so that the center Iac of the image Ia, the center 2ac of the first individual lens 2a, and the center Dac of the display image Da are arranged on a single straight line.

Figure 5B:
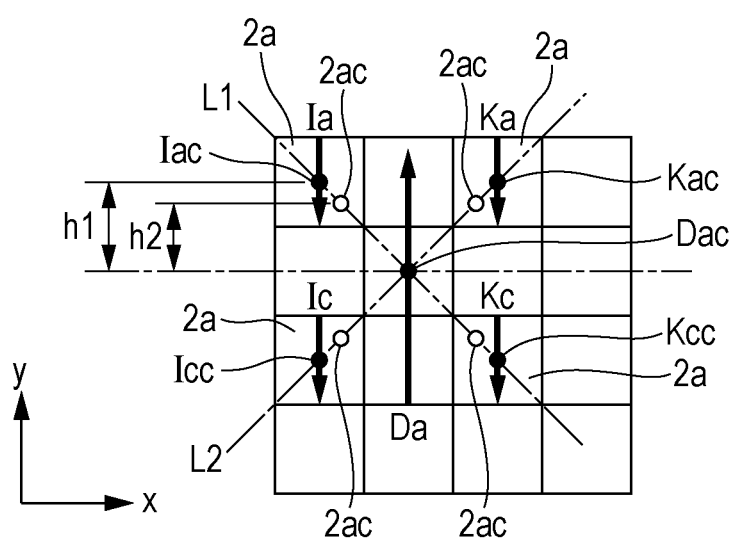
FIG. 5B illustrates the positional relationship between images displayed in division regions, individual lenses, and display images viewed along the optical axis from a side at which an image Ia is located.

FIG. 5B schematically illustrates the positional relationship between the image Ia displayed in the division region A11, the image Ic displayed in the division region A31, an image Ka displayed in the division region A13, an image Kc displayed in the division region A33, the first individual lenses 2a, and the display image Da, viewed along the optical axis from the side at which the image Ia is located. When the image Ia, the image Kc, the first individual lenses 2a corresponding to the images Ia and Kc, and the display image Da are viewed along the optical axis from the side at which the images Ia and Kc are located, the first individual lenses 2a are arranged so that the center Iac of the image Ia, the center 2ac of the first individual lens 2a corresponding to the image Ia, the center Dac of the display image Da, the center 2ac of the first individual lens 2a corresponding to the image Kc, and the center Kcc of the image Kc are arranged on a straight line L1. Similarly, when the image Ka, the image Ic, the first individual lenses 2a corresponding to the images Ka and Ic, and the display image Da are viewed along the optical axis from the side at which the images Ka and Ic are located, the first individual lenses 2a are arranged so that the center Kac of the image Ka, the center 2ac of the first individual lens 2a corresponding to the image Ka, the center Dac of the display image Da, the center 2ac of the first individual lens 2a corresponding to the image Ic, and the center Icc of the image Ic are arranged on a straight line L2.

When the distance between the center 2ac of the first individual lens 2a corresponding to the image Ia and the center Dac of the display image Da is h2 and the distance between the center Iac of the image Ia and the center Dac of the display image Da is h1 in the vertical direction (y direction), Equation (5) given below is satisfied. This also applies to the images Ic, Ka, and Kc.

$$h1/h2=(ba+a)/ba \quad (5)$$

Referring to FIG. 5B, by adjusting the relative positions between the individual lenses and the division regions by shifting the centers of the individual lenses and the centers of the images displayed in the division regions relative to each other, the imaging locations of the images displayed in the division regions can be freely adjusted. Accordingly, the images displayed in the division regions can be focused on the same image plane such that the images overlap to form a single display image.

The display images Da, Db, Dc, and Dd formed in the above-described manner are images that are actually focused at the respective positions when viewed from the eyes 4R and 4L of the user 4. Even when the images are viewed by one eye, the condition (1) focusing of the crystalline lens is satisfied. When the images are viewed by both eyes, the conditions (2) parallax between both eyes and (3) convergence of both eyes are additionally satisfied. Since depth perception is achieved by focusing of the crystalline lens, the display images seem natural to the eye. Also, when the display images are viewed by both eyes, since the focus position coincides with the intersection of the lines of sight of both eyes, the visual stress experienced by the user 4 can be reduced. In addition, since the focal length of the lens 2 can be reduced as the size of the division regions is reduced, the image display device 10a including the display 1a and the lens 2 can be reduced in size and thickness.

The first individual lenses 2a, the second individual lenses 2b, the third individual lenses, and the fourth individual lenses may be arranged such that the display images Da, Db, Dc, and Dd overlap if translated in the thickness direction of the display 1a, that is, in the z direction or the direction of lines of sight of the user 4. In the example illustrated in FIG. 1, the display image Dd, the display image Da, the display image Db, and the display image Dc are arranged in that order from the user 4 so as to overlap in the x and y directions when viewed by the user 4. In the present embodiment, when the display images Dd, Da, Db, and Dc are translated along the z axis, the centers thereof overlap each other.

When the eyes of the user 4 are focused on a certain display image, the other display images are blurred and do not bother the user. However, when the distances between the display images are small relative to the distance from the user 4 to the display images, there is a possibility that the display images at the back will be visible through the display images at the front. Accordingly, the light emission states of the light emitting elements in regions where the display images Da, Db, Dc, and Dd overlap when the display images Da, Db, Dc, and Dd are translated in the z direction may be set in association with each other. More specifically, for example, when the light emitting elements d4, d6, f4, and f6, which constitute a part of the display image Dd, are turned on so as to be visible to the user 4, the light emitting elements c3, c5, e3, and e5, which are behind the light emitting elements d4, d6, f4, and f6, of the display image Da may be turned off so as not to be visible to the user 4. In this case, the display image at the back is prevented from being visible to the user 4 through the display image at the front. Similarly, the light emitting elements d3, d5, f3, and f5 of the display image Db and the light emitting elements c4, c6, e4, and e6 of the display image Dc, which also correspond to the light emitting elements d4, d6, f4, and f6, may be turned off. Thus, in the regions where the display images overlap, when the light emitting elements 3 used to form a display image at the front are turned on, the light emitting elements 3 used to form the display images behind the display image at the front may be turned off.

The positional relationship between the light emitting elements 3 in the front-back direction cannot be determined directly from the arrangement of the light emitting elements 3 illustrated in FIG. 2. However, referring to the arrangement of the light emitting elements 3 in FIG. 3A, for example, it is clear that the light emitting elements c5, d5, and c6, whose imaging locations are directly behind the imaging location of the light emitting element d6 in the z direction, are adjacent to the light emitting element d6. Since the arrangement of the light emitting elements 3 illustrated in FIG. 3A is converted into the arrangement of the light emitting elements 3 illustrated in FIG. 2 in accordance with a certain rule as described above, the light emitting elements 3 whose imaging locations are directly behind the imaging location of a specific light emitting element 3 in the z direction can be easily determined by reversely applying the rule. Therefore, blink comparison may be performed for the light emitting elements 3 in the arrangement illustrated in FIG. 3A, and the light emission states of the light emitting elements 3 may be controlled so that, when the light emitting elements 3 whose imaging locations are at the front are turned on, the light emitting elements 3 whose imaging locations are directly therebehind are turned off. Thus, reduction in visibility of the display images at the front due to the display images at the back can be prevented.

As described above, the display image Dd and the display image Da are separated from each other in the z direction. The light intensity distribution of the light emitting elements d4, d6, f4, and f6, which constitute a part of the display image Dd, along an optical axis (z axis) is shown by curve Td in FIG. 1, and the light intensity of each bright spot is at a maximum at the position where the display image Dd is formed. The light intensity distribution of the light emitting elements c3, c5, e3, and e5, which constitute a part of the display image Da, along the optical axis (z axis) is shown by curve Ta in FIG. 1, and the light intensity of each bright spot is at a maximum at the position where the display image Da is focused. Therefore, when these light emitting elements are turned on or caused to blink together and the amount of light emission is adjusted, the peak of the bright-spot light intensity can be shifted to an intermediate position between the display image Da and the display image Dd, as shown by curve Tad in FIG. 1. In other words, by adjusting the amount of light emitted from the light emitting elements 3 whose imaging locations are arranged in the front-back direction, the imaging location of the display images can be continuously moved along the optical axis.

As illustrated in FIG. 2, the display 1a has the basic region A, which includes the division regions A11, A13, A31, and A33. In other words, the basic region A includes all of the division regions used to form the display image Da. When the distance between the display 1a and the lens 2 is Ra and the distance between the display image Da and the lens 2 is Rb, the horizontal magnification of the display image Da is Rb/Ra. In the present embodiment, Rb/Ra is set so that the area of the display image Da is substantially equal to the area of the basic region A. More specifically, Rb/Ra=4 is satisfied. This can be generalized as follows. That is, Rb/Ra is determined so as to satisfy Rb/Ra=n, where n (=nx=ny) is a partition number used when the basic region A is divided into the division regions.

A basic region E having the same structure as that of the basic region A may be arranged next to the basic region A, and a lens 2 similar to that for the basic region A may be arranged so as to correspond to a plurality of division regions included in the basic region E. In this case, images displayed by some of the division regions included in the basic region E are focused by the lens 2 on the same plane as the plane including the display image Da as a display image Ea. The display image Ea is formed so as to be continuous to the display image Da. Accordingly, for example, the screen size of the display 1a may be increased, and the display 1a may be divided into a plurality of basic regions having the same structure as that of the basic region A. Images displayed by division regions included in each basic region may be focused by the corresponding lens 2 so that the display images can be connected to each other. Thus, the image display device 10a is capable of displaying display images for a large screen.

Modifications

Figure 6:
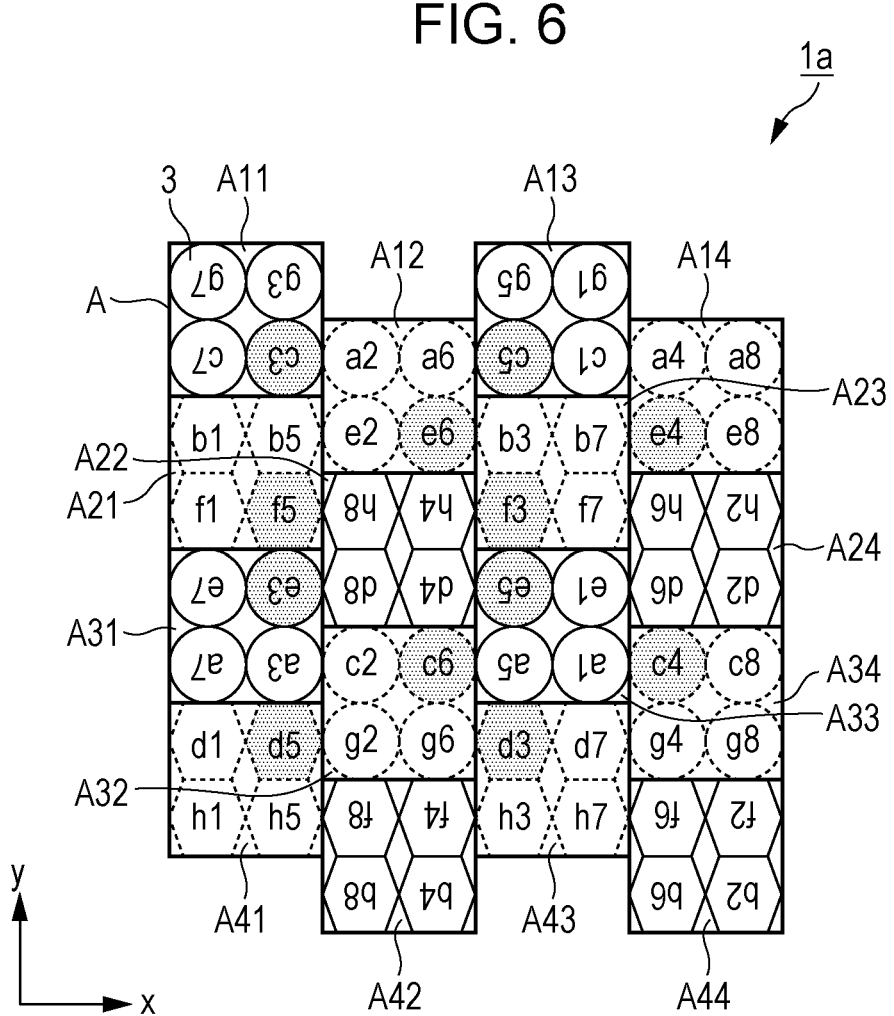
FIG. 6 schematically illustrates an arrangement of light emitting elements included in a display according to a modification.

The present embodiment may be modified in various ways. The arrangement of the light emitting elements 3 included in the display 1a, for example, may be modified as illustrated in FIG. 6. More specifically, the division regions on the even-numbered columns may be shifted from the division regions on the odd-numbered columns in the y direction. Alternatively, the division regions on each row may be shifted in the x direction. Also, the division regions may have a rectangular shape other than a square shape, a substantially triangular shape, a polygonal shape such as a substantially hexagonal shape, or a substantially circular shape.

The first individual lenses 2a, the second individual lenses 2b, the third individual lenses, and the fourth individual lenses for the division region groups Gr1, Gr2, Gr3, and Gr4, respectively, may be located at different distances from the display 1a so that the display images Da, Db, Dc, and Dd corresponding to the division region groups Gr1, Gr2, Gr3, and Gr4, respectively, are formed at different positions in the thickness direction of the display 1a (z direction). In this case, the first individual lenses 2a, the second individual lenses 2b, the third individual lenses, and the fourth individual lenses may either have the same focal length or different focal lengths.

As long as the display images Dc, Da, Db, and Dd overlap in the x direction or the y direction when viewed from the user 4, the centers of the display images Dc, Da, Db, and Dd may be shifted from each other in the x direction or the y direction when the display images Dc, Da, Db, and Dd are translated in the z axis direction. In this case, the light emitting elements 3 whose imaging locations are directly behind the imaging location of a specific light emitting element 3 in the z direction may be determined in consideration of the amount of shift in the x direction or the y direction between the display image at the front and the display images at the back in addition to the above-described rule of the arrangement of the light emitting elements 3.

As long as the division regions which display images that form each display image are dispersed over the display and the images displayed in the division regions are combined together to form the display image by the focusing effect of the lens, the method for dividing the basic region into the middle regions and dividing each middle region into the division regions is not limited to the above-described method. In addition, the method for arranging the middle regions and the division regions is also not limited to the above-described method. In addition, it is not necessary that the image displayed in each division region be an image obtained by discretely thinning out the display image. In this case, the images displayed in the division regions are the same and not thinned, and are combined together to form the display image by the focusing effect of the lens. In this case, although the optical interpolation effect cannot be obtained, even when the display images displayed in some of the division regions are blocked by a lens barrel or the like when viewed from the user 4, display images displayed in other division regions can be viewed. Therefore, the stability of the angle of view can be ensured.

Although the lens 2 may be a single lens, the actual lens 2 may be designed as an achromatic anastigmat lens. Accordingly, the lens 2 may be a compound lens in which a high refractive index, high dispersion material and a low refractive index, low dispersion material are combined. The lens 2 may be an aspherical lens. The high refractive index, high dispersion material may be, for example, optical glass SF11 manufactured by Schott, and the low refractive index, low dispersion material may be, for example, optical glass BK7 manufactured by Schott. A diffraction lens may be used as a part of the lens 2. In this case, for example, a base member having a low refractive index, high dispersion diffraction structure may be covered with a high refractive index, low dispersion transparent material. In this case, the dependence of diffraction efficiency on the wavelength of light can be reduced and high diffraction efficiency can be maintained. Since light usage efficiency can be increased as gaps between the adjacent lenses in the x and y directions are reduced, the lens 2 may have an array structure obtained by integral forming using a mold.

The pixels of the display 1a are precisely arranged by applying, for example, a semiconductor process. In the case where a mold is used to form the lens 2, the positions of the individual lenses may be controlled with submicron precision. Accordingly, the lens is designed and manufactured so that the positions of the individual lenses are shifted from the predetermined positions. Then, after the positions of the display 1a and the lens 2 formed as a lens array are adjusted, the position of each pixel is electrically shifted. Thus, the position adjustment of the images displayed in the division regions and the lens can be easily performed.

Figure 7A:
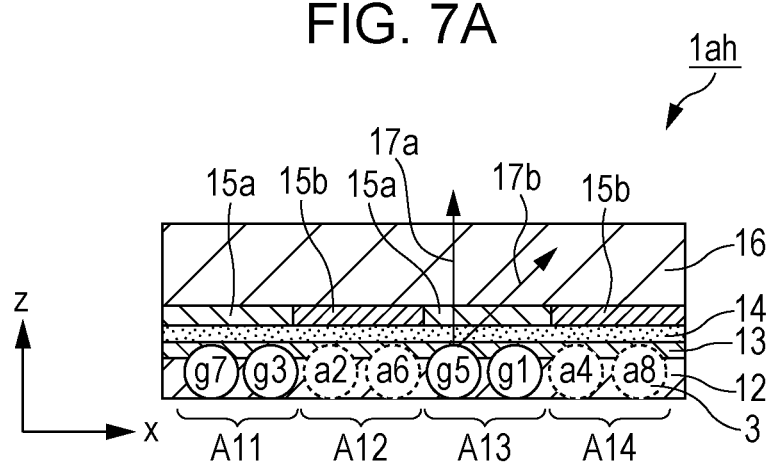
FIG. 7A is a sectional view of a display according to another modification.

A display 1ah according to another modification of the present embodiment includes a plurality of color filters having different colors. A color filter of a single color is arranged in each division region. More specifically, as illustrated in FIG. 7A, the display 1ah is structured such that a light emitting layer 12, a transparent electrode layer 13, an adhesive layer 14, color filters 15a, color filters 15b, and a protective substrate 16 are stacked together. The color filters 15a and the color filters 15b have different colors.

The display 1ah is, for example, an organic EL display. A light emitting element g7, a light emitting element g3, . . . , and a light emitting element a8, which correspond to the light emitting elements 3 on the first row of the arrangement illustrated in FIG. 2, are arranged in the x direction in the light emitting layer 12. Among these light emitting elements, the light emitting elements g7 and g3 belong to a division region A11, the light emitting elements a2 and a6 belong to a division region A12, the light emitting elements g5 and g1 belong to a division region A13, and the light emitting elements a4 and a8 belong to a division region A14. One of the color filters 15a having a single color is arranged in the division region A11, and one of the color filter 15b having another color is arranged in the division region A12.

Figure 7B:
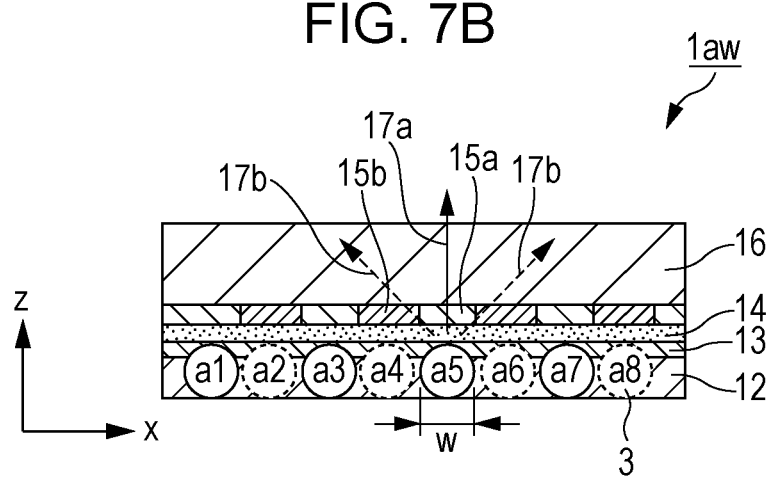
FIG. 7B is a sectional view of a display according to the related art.

In a display 1aw according to the related art, as illustrated in FIG. 7B, color filters 15a and 15b having different colors are alternately arranged for pixels corresponding to light emitting elements. With the increase in resolution, the width of each filter, which corresponds to the width w of each pixel, has been reduced, and there are displays in which the width of each filter is as small as several micrometers. In this case, light 17a that is emitted from, for example, the light emitting element a5 and travels in a direction perpendicular to a surface of a protective substrate 16 passes through a color filter 15a, for example, a green color filter, and is extracted as light of a predetermined color, for example, green light. However, light 17b that is emitted from the light emitting element a5 at an angle with respect to the surface of the protective substrate 16 passes through a color filter 15b, for example, a blue color filter, which is adjacent to the color filter 15a. As a result, a part of the light emitted from the light emitting element a5 is absorbed and the emitted light is attenuated. A similar phenomenon occurs for other light emitting elements. The attenuation of the light emitted from the light emitting elements increases as the ratio of the width of each pixel to the distance from the color filters 15a and 15b to light sources of the light emitting elements decreases. Therefore, light extraction efficiency of light emitted from the light emitting elements is low in the display 1aw according to the related art.

In contrast, in the display 1ah, each color filter 15a having a single color is arranged in a division region including a plurality of light emitting elements. The reason why a color filter having a single color can be arranged in each division region is because the light emitting elements corresponding to the same color can be collected in the same division region by the method for arranging the light emitting elements 3 described in the present embodiment. Therefore, light 17b emitted from the light emitting elements g5 at an angle with respect to the surface of the protective substrate 16 also passes through the color filter 15a, for example, a green color filter and is extracted as light of a predetermined color, for example, green light. Also for other light emitting elements, light emitted at an angle with respect to the surface of the protective substrate 16 can be extracted as light of a predetermined color. Thus, in the display 1ah according to the present modification, the light extraction efficiency of light emitted from the light emitting elements 3 is increased.

Figure 8A:
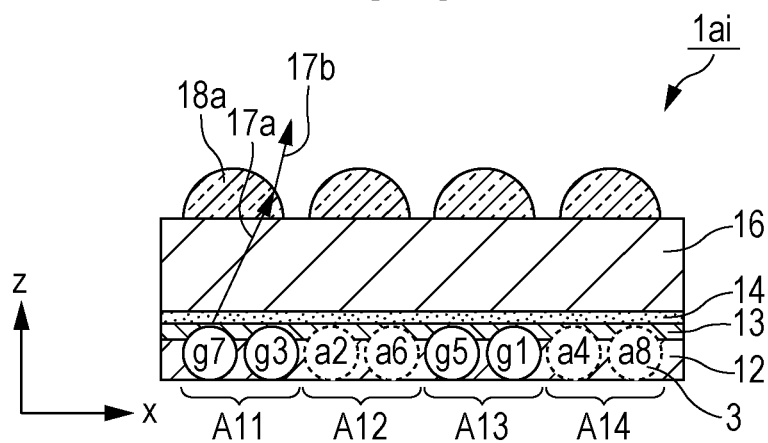
FIG. 8A is a sectional view of a display according to another modification.

A display 1ai according to another modification includes a protective substrate 16. An image display device according to this modification includes convex lenses 18a. As illustrated in FIG. 8A, the protective substrate 16 is a transparent substrate arranged at the forefront of the display 1ai. The protective substrate 16 is, for example, a glass substrate. The convex lenses 18a are in tight contact with the protective substrate 16 and are arranged so as to correspond to the respective division regions. The display 1ai is, for example, an organic EL display, and has a structure similar to that of the display 1ah except that the color filters 15a and 15b are omitted. The convex lenses 18a have an arc-shaped cross section along a plane perpendicular to a surface of the protective substrate 16. The convex lenses 18a are arranged so as to correspond to respective division regions A11, A12, A13, and A14. The refractive index of the convex lenses 18a is substantially equal to the refractive index of the protective substrate 16.

Figure 9A:
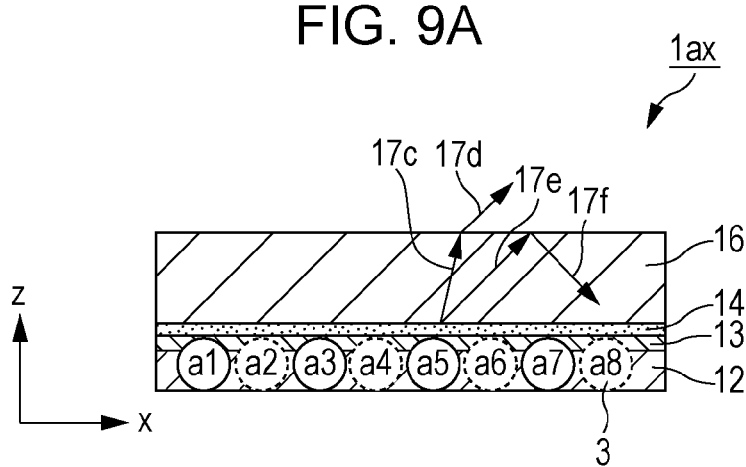
FIG. 9A is a sectional view of a display to be compared with the display illustrated in FIG. 8A.

Referring to FIG. 9A, a display 1ax to be compared with the display 1ai has a structure similar to that of the display 1ai except that the arrangement of light emitting elements 3 is the same as the arrangement illustrated in FIG. 3A, which is the origin of the thought process that leads to the arrangement of the light emitting elements 3 according to the present embodiment. The thickness of a protective substrate 16 is about 0.7 mm. A component 17c of light emitted from, for example, a light emitting element a5, which corresponds to a pixel in a light emitting layer 12, the component 17c being emitted at an angle close to the right angle with respect to a surface of the protective substrate 16, passes through the surface of the protective substrate 16 and can be extracted to the outside of the display 1ax as light 17d. However, a component 17e that is emitted at an angle exceeding a critical angle with respect to the surface of the protective substrate 16 is totally reflected by the surface of the protective substrate 16 as light 17f, and cannot be extracted to the outside of the display 1ax.

Figure 9B:
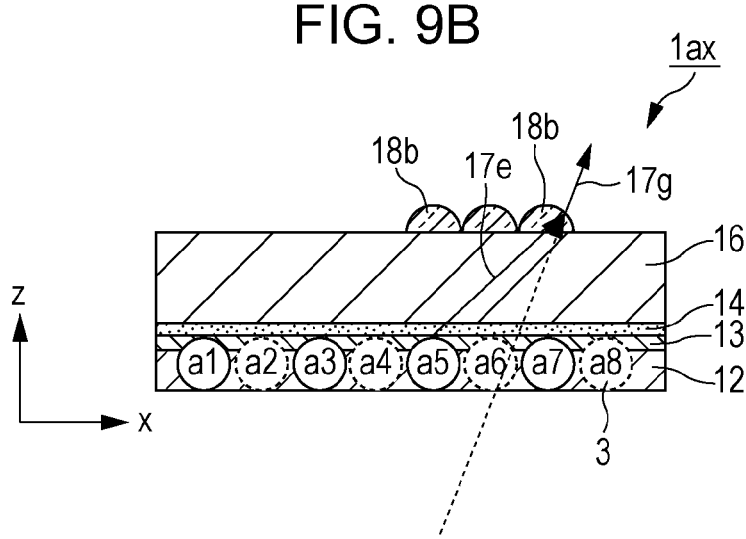
FIG. 9B is a sectional view of another display to be compared with the display illustrated in FIG. 8A.

Accordingly, as illustrated in FIG. 9B, convex lenses 18b whose diameter is substantially equal to the dimension of the light emitting elements 3 may be provided on the surface of the protective substrate 16, so that the light component 17e that is emitted from the light emitting element a5 and totally reflected in FIG. 9A can be extracted to the outside of the display 1ax as light 17g. The refractive index of the convex lenses 18b is substantially equal to the refractive index of the protective substrate 16. In this case, the light 17e that is emitted from the light emitting element a5 and incident on one of the convex lenses 18b can be extracted. However, depending on the thickness of the protective substrate 16, there is a risk that the position of the light emitting element a5 does not match the position of the convex lens 18b corresponding to the light emitting element a5. Therefore, as illustrated in FIG. 9B, the light 17g extracted through one of the convex lenses 18b may seem as if it has been emitted from a deeper position, as shown by the dashed line, and the image of the light emitting element a5 is blurred.

Figure 9C:
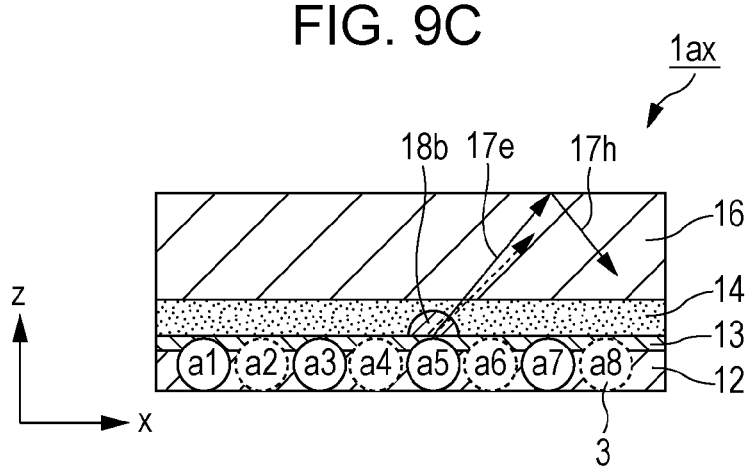
FIG. 9C is a sectional view of another display to be compared with the display illustrated in FIG. 8A.

Accordingly, as illustrated in FIG. 9C, to match the positions of the convex lenses with the positions of the light emitting elements, the thickness of the adhesive layer 14 may be increased and the convex lenses 18b may be embedded in the adhesive layer 14. However, it is difficult to increase the difference between the refractive index of the adhesive layer 14 and that of the convex lenses 18b to about 0.2 or more, and the refraction effect achieved by the convex lenses 18b is small. The light 17e emitted from the light emitting element a5 and incident on one of the convex lenses 18b is refracted, although slightly, as shown by the solid line from the path shown by the dashed line, which is the path along which the light travels when the convex lenses 18b are not provided. However, the light 17e is totally reflected by the surface of the protective substrate 16 as light 17h. As a result, the light 17e cannot be extracted to the outside of the display 1ax.

In the display 1ai, the light emitting elements 3 are arranged in accordance with the process for arranging the light emitting elements 3 described in the present embodiment. Therefore, the diameter of the convex lenses 18a can be set so as to match the size of the division regions. More specifically, the convex lenses 18a are in tight contact with the surface of the protective substrate 16 and are arranged so as to correspond to the division regions. Therefore, for example, a large part of light 17a emitted from light emitting elements g7 and g3 of the division region A11 can be caused to pass through the corresponding convex lens 18a and extracted to the outside of the display 1ai as light 17b. As described in the present embodiment, the lens 2 causes the extracted light 17b to interpolate the images displayed by the light emitting elements in other division regions. The convex lenses 18a may be formed integrally with the lens 2.

Figure 8B:
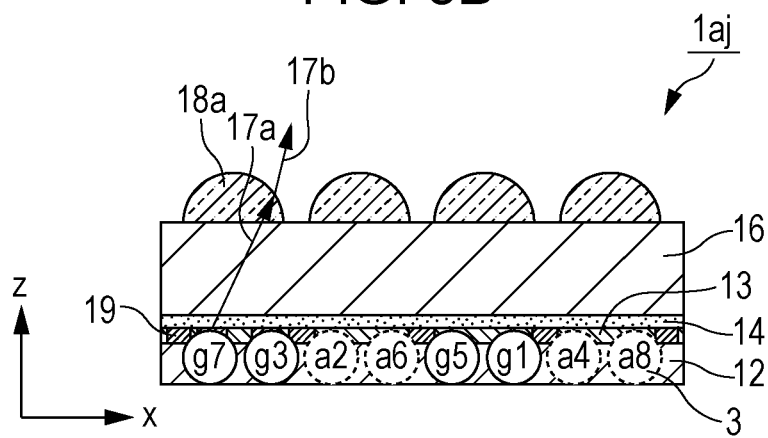
FIG. 8B is a sectional view of a display according to another modification.

As in a display 1aj illustrated in FIG. 8B, the light emitting elements 3 may be arranged so as to be shifted toward the centers of the respective division regions, and metal grid wiring 19 for reducing the electric resistance of the transparent electrode 13 may be additionally provided in the newly formed gaps. In this case, since the light emitting elements are shifted toward the centers of the respective division regions, light extraction efficiency of light emitted from the light emitting elements 3 can be further increased.

Second Embodiment

An image display device 10b according to a second embodiment will now be described. The structure of the second embodiment is similar to that of the first embodiment unless otherwise specified. Components that are the same as or that correspond to those in the first embodiment are denoted by the same reference numerals as in the first embodiment, and explanations thereof may be omitted. The description and modifications of the first embodiment are applicable to the second embodiment unless there are any technically contradictions. Also, modifications of the second embodiment are applicable to the first embodiment unless there are any technically contradictions.

Figure 10:
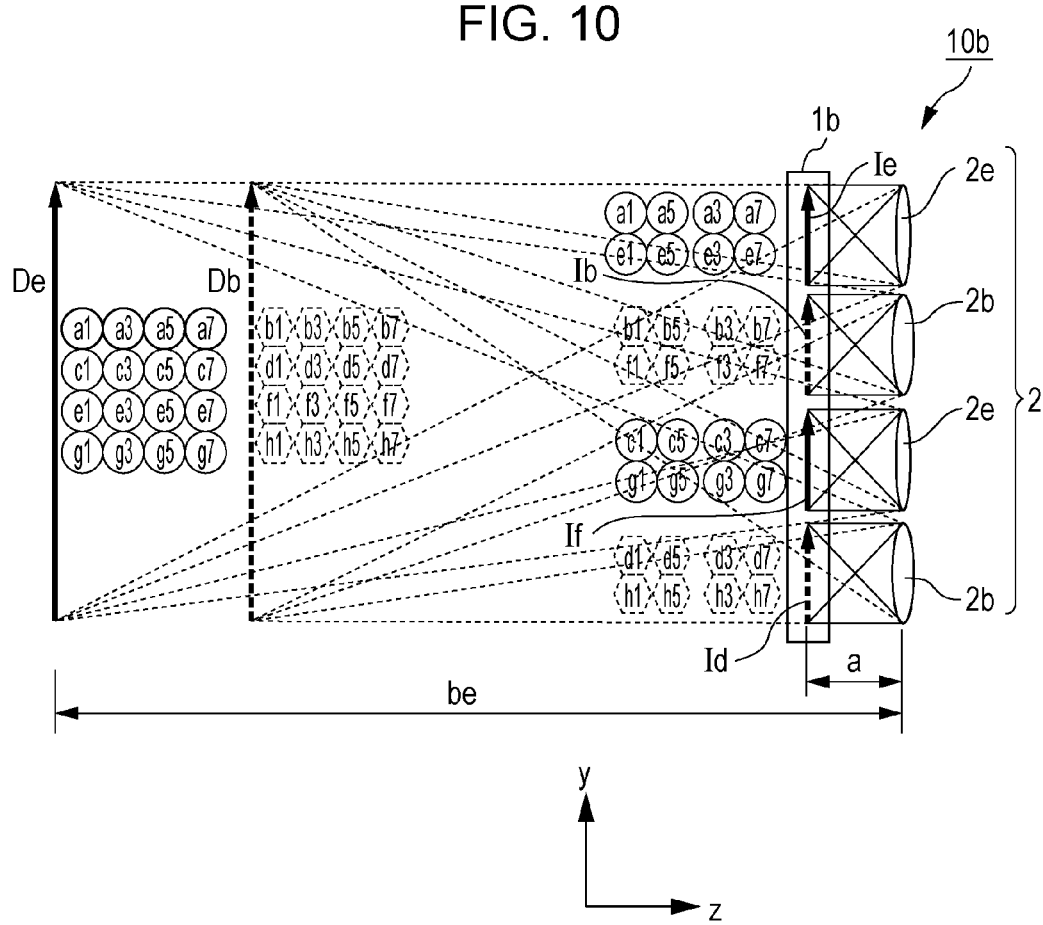
FIG. 10 is a sectional view schematically illustrating the structure of an image display device according to a second embodiment, the positional relationship between a display, a lens, and display images, and optical paths.
Figure 11:
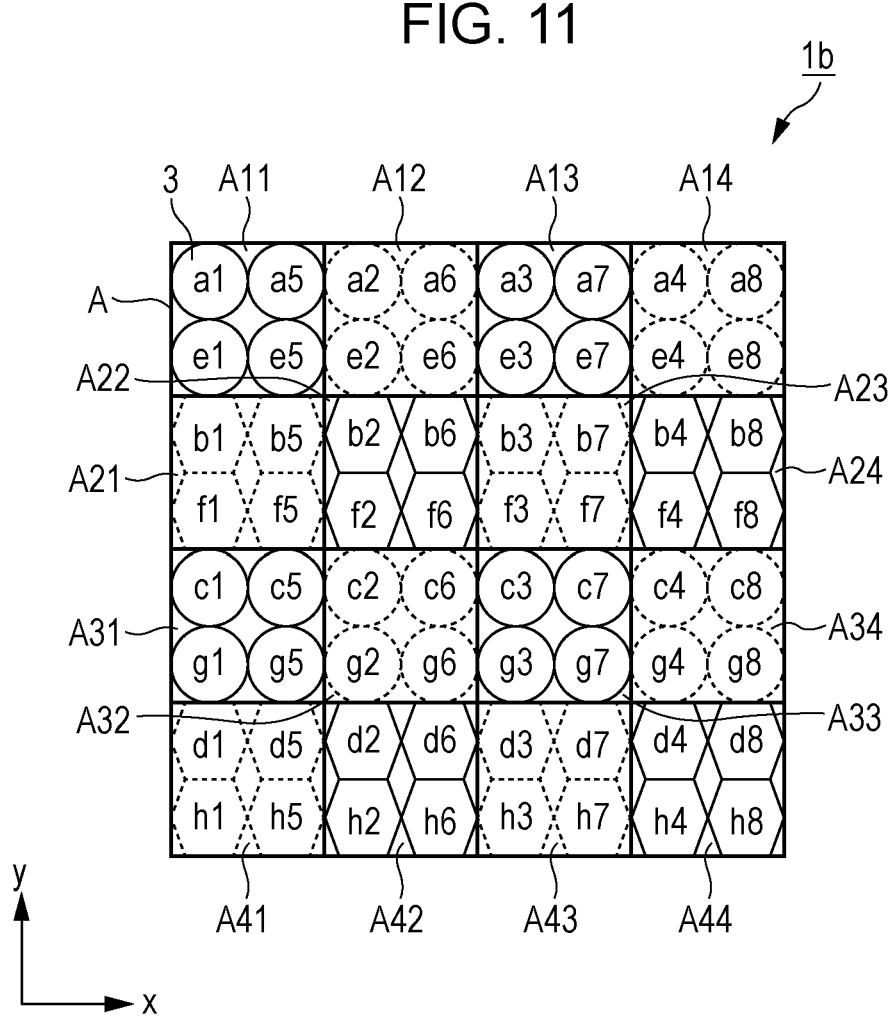
FIG. 11 schematically illustrates an arrangement of light emitting elements included in the display according to the second embodiment.

As illustrated in FIG. 10, the image display device 10b includes a display 1b and a lens 2. In the image display device 10b, the arrangement of light emitting elements 3 in the display 1b differs from the arrangement of the light emitting elements 3 in the display 1a. More specifically, the light emitting elements 3 of the display 1b are arranged as illustrated in FIG. 11. In other words, in a basic region A, the light emitting elements 3 are not inverted in any of the division regions.

The thought process that leads to the arrangement of the light emitting elements 3 in the display 1*b* will be described with reference to FIGS. 3A to 3C and 11. First, the basic region A illustrated in FIG. 3A, which is the origin of the thought process, is evenly divided into four regions, which are a middle region A1, a middle region A2, a middle region A3, and a middle region A4, in a manner similar to that in the first embodiment. Next, as illustrated in FIG. 11, the basic region A is divided into 16 division regions. At this time, the light emitting elements 3 included in the middle region A1 are arranged in the division regions A11, A13, A31, and A33 so that every other light emitting elements 3 are collected in the same division region in both the x direction and the y direction. The light emitting elements 3 included in the middle region A2 are arranged in the division regions A21, A23, A41, and A43 so that every other light emitting elements 3 are collected in the same division region in both the x direction and the y direction. The light emitting elements 3 included in the middle region A3 are arranged in the division regions A12, A14, A32, and A34 so that every other light emitting elements 3 are collected in the same division region in both the x direction and the y direction. The light emitting elements 3 included in the middle region A4 are arranged in the division regions A22, A24, A42, and A44 so that every other light emitting elements 3 are collected in the same division region in both the x direction and the y direction. The above-described process can be generalized as follows. That is, assuming that mx and my are natural numbers, the basic region A includes mx×my light emitting elements 3. In addition, assuming that nx and ny are divisors of mx and my, respectively, the basic region A is divided into nx×ny division regions. In the example of FIG. 11, mx=my=8 and nx=ny=4. At this time, the division regions that belong to the same division region group are arranged so as to have mx/nx−1 division regions disposed therebetween in the x direction and my/ny−1 division regions disposed therebetween in the y direction. Here, it is not necessary that the division regions be arranged according to this rule. Then, the light emitting elements 3 are rearranged in the corresponding division regions so that every two light emitting elements 3 having nx−1 light emitting elements 3 therebetween in the x direction and every two light emitting elements 3 having ny−1 light emitting elements 3 therebetween in the y direction are collected in the same division region. Thus, the arrangement of the light emitting elements 3 in the display 1*b* is determined.

The image display device 10*b* differs from the image display device 10*a* in that fifth individual lenses 2*e* are provided in place of the first individual lenses 2*a*, and sixth individual lenses (not shown) are provided in place of the fourth individual lenses. When the distance from a surface of the display 1*b* to each individual lens is a, the focal lengths fe and ff of the fifth individual lenses 2*e* and the sixth individual lenses, respectively, satisfy fe>a, and ff>a. Each fifth individual lens 2*e* focuses an image displayed in the division region corresponding to the fifth individual lens 2*e*, for example, the division region A11, as a virtual image at a position separated from the fifth individual lens 2*e* by a distance be determined by Equation (6) given below. Each sixth individual lens focuses an image displayed in the division region corresponding to the sixth individual lens, for example, the division region A22, as a virtual image at a position separated from the sixth individual lens by a distance bf determined by Equation (7) given below.

$$be = fe \times a / (fe - a) \quad (6)$$

$$bf = ff \times a / (ff - a) \quad (7)$$

The fifth individual lenses 2*e* focus the images displayed in the division regions A11, A13, A31, and A33 as virtual images on the same image plane so that the virtual images overlap to form a display image De. As illustrated in FIG. 10, the display image De is located behind a display image Db in the thickness direction of the display 1*b*. The fifth individual lenses 2*e* are arranged so that if the display image De is translated in the thickness direction of the display 1*b*, the display image De overlaps the display image Db when viewed from a user 4. When viewed from the user 4, the display image De overlaps the display image Db in the x and y directions.

The sixth individual lenses focus the images displayed in the division regions A12, A14, A32, and A34 as virtual images on the same image plane so that the virtual images overlap to form a display image Df. The sixth individual lenses are arranged so that if the display image Df is translated in the thickness direction of the display 1*b*, the display image Df overlaps the display image De and the display image Db when viewed from the user 4.

An image Ie displayed in the division region A11 is not inverted, and is focused as a virtual image. The positions of the images displayed in the division regions A11, A13, A31, and A33 are adjusted with respect to the center axes of the fifth individual lenses 2*e*. Accordingly, the display image De is formed such that an image formed by a light emitting element 3 that belongs to the division region A13, for example, is inserted between images formed by light emitting elements 3 that belong to the division region A11 and that are adjacent to each other. The images displayed in the division regions A11, A13, A31, and A33 are, for example, images obtained by discretely thinning out the display image De. Therefore, the resolution of each of the images displayed in the division regions A11, A13, A31, and A33 is low. However, since these images interpolate each other to form the display image De, a high-resolution image can be displayed by the image display device 10*b*.

Similar to the first embodiment, the display image De is actually focused at that position when viewed from the eyes 4R and 4L of the user 4. Even when the images are viewed by one eye, the condition (1) focusing of the crystalline lens is satisfied. When the images are viewed by both eyes, the conditions (2) parallax between both eyes and (3) convergence of both eyes are additionally satisfied. Since depth perception is achieved by focusing of the crystalline lens, the display images seem natural to the eye. Also, when the display images are viewed by both eyes, since the focus position coincides with the intersection of the lines of sight of both eyes, the visual stress experienced by the user 4 can be reduced.

Figure 12A:
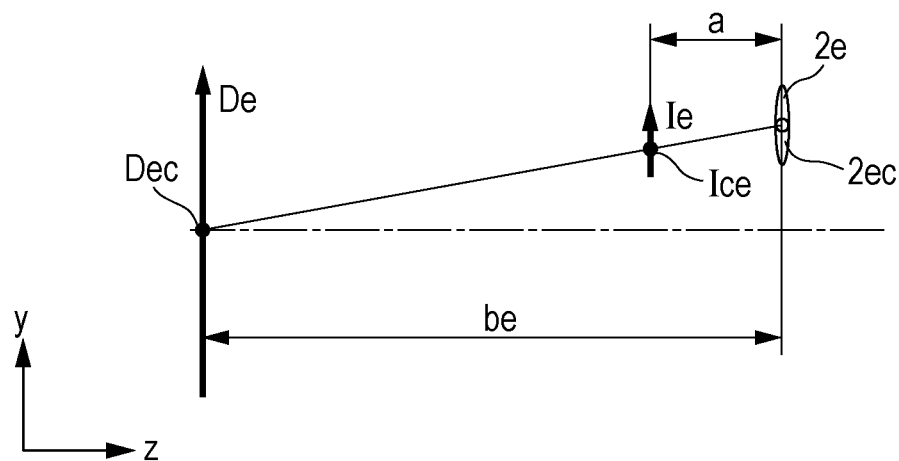
FIG. 12A illustrates the positional relationship between an image displayed in a division region, an individual lens, and a display image along an optical axis.

An example of adjustment of the positions of the images displayed in the division regions and the positions of the individual lenses will now be explained with reference to FIGS. 12A and 12B. FIG. 12A schematically illustrates the positional relationship between the fifth individual lens 2*e* that corresponds to the division region A11, the image Ie displayed in the division region A11, and the display image De. The distance between the fifth individual lens 2*e* and the image Ie is defined as a, and the distance between the fifth individual lens 2*e* and the display image De is defined as be. On the basis of the lens formula, the relative positional relationship between the fifth individual lens 2*e* and the image Ie is determined so that the center 2*ec* of the fifth individual lens, the center Iec of the image Ie, and the center Dec of the display image De are arranged on a single straight line.

Figure 12B:
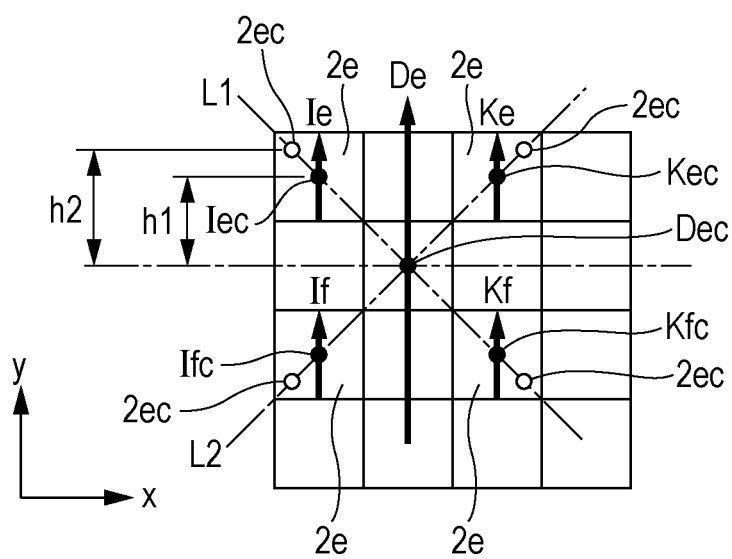
FIG. 12B illustrates the positional relationship between images displayed in division regions, individual lenses, and display images viewed along the optical axis from a side at which fifth individual lenses are located.

FIG. 12B schematically illustrates the positional relationship between the fifth individual lenses 2*e*, the image Ie displayed in the division region A11, an image If displayed in the division region A31, an image Ke displayed in the division region A13, an image Kf displayed in the division region A33, and the display image De, viewed along the optical axis from the side at which the fifth individual lenses 2e are located. When the fifth individual lenses 2e corresponding to the images Ie and Kf, the images Ie and Kf, and the display image De are viewed along the optical axis from the side at which the fifth individual lenses 2e are located, the fifth individual lenses 2e are arranged so that the center 2ec of the fifth individual lenses 2e corresponding to the image Ie, the center Iec of the image Ie, the center Dec of the display image De, the center Kfc of the image Kf, and the center 2ec of the fifth individual lens 2e corresponding to the image Kf are arranged on a straight line L1. When the fifth individual lenses 2e corresponding to the images Ke and If, the images Ke and If, and the display image De are viewed along the optical axis from the side at which the fifth individual lenses 2e are located, the fifth individual lenses 2e are arranged so that the center 2ec of the fifth individual lenses 2e corresponding to the image Ke, the center Kec of the image Ke, the center Dec of the display image De, the center Ifc of the image If, and the center 2ec of the fifth individual lens 2e corresponding to the image If are arranged on a straight line L2.

When the distance between the center Iec of the image Ie and the center Dec of the display image De is h1 and the distance between the center 2ec of the fifth individual lens 2e corresponding to the image Ie and the center Dec of the display image De is h2 in the vertical direction (y direction), Equation (8) given below is satisfied. This also applies to the images If, Ke, and Kf.

$$h2/h1=be/(be-a) \quad (8)$$

Referring to FIG. 12B, by adjusting the relative positions between the individual lenses and the division regions by shifting the centers of the individual lenses and the centers of the images displayed in the division regions relative to each other, the imaging locations of the images displayed in the division regions can be freely adjusted. Accordingly, the images displayed in the division regions can be focused on the same image plane such that the images overlap to form a single display image.

Modifications

Figure 13:
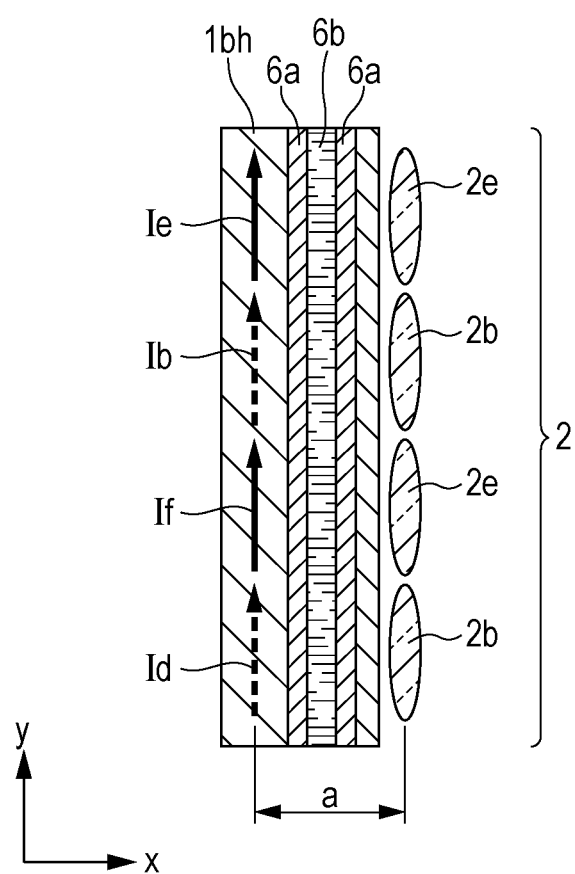
FIG. 13 is a sectional view schematically illustrating the structure of a display according to a modification.

The present embodiment may be modified in various ways. The display 1b may have a structure similar to that of a display 1bh according to a modification illustrated in FIG. 13. The display 1bh includes a liquid crystal layer 6b that is sandwiched between transparent electrodes 6a and that is disposed between a lens 2 and images displayed in respective division regions. The transparent electrodes 6a are configured to be capable of applying a voltage to the division regions individually. As is clear from, for example, Equation (6), the distance between the lens 2 and the position at which a virtual image is formed, for example, be, is the function of the distance a. When the distance a is close to a focal length, for example, fe, the position at which the virtual image is formed greatly changes in response to a change in the distance a. The optical length of the distance a can be changed by changing the refractive index of the liquid crystal layer 6b by applying a voltage to the transparent electrodes 6a of the display 1ah. Accordingly, the position at which each virtual image is formed by the lens 2 can be changed. An actuator, such as a piezoelectric element, for moving the lens along the optical axis may be provided in place of or in addition to the liquid crystal layer 6b of the display 1bh. Accordingly, the position of each virtual image formed by the lens 2 can be changed.

Figure 14:
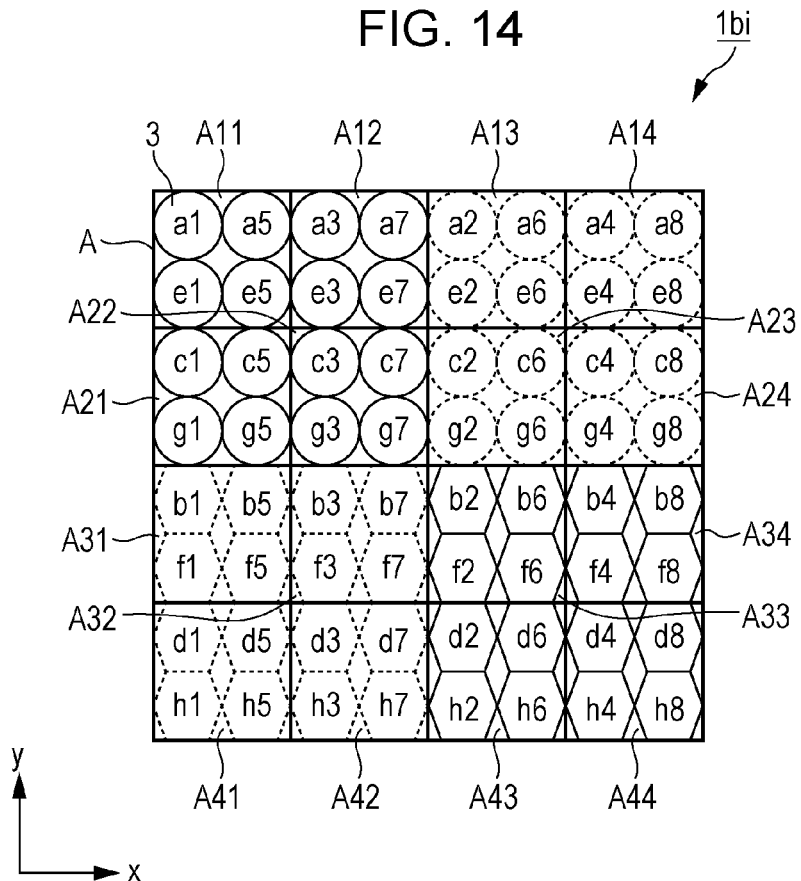
FIG. 14 schematically illustrates an arrangement of light emitting elements included in a display according to another modification.

The light emitting elements 3 included in the display 1b may be arranged as in a display 1bi according to another modification illustrated in FIG. 14. The thought process that leads to the arrangement of the light emitting elements 3 according to the present modification will be described with reference to FIGS. 3A to 3C and 14. The basic region A illustrated in FIG. 3A, which is the origin of the thought process, is divided into the middle regions A1, A2, A3, and A4 in a manner similar to that in the first embodiment. When the basic region A is divided into 4×4 division regions, the light emitting elements 3 included in the middle region A1 are arranged in the division regions A11, A12, A21, and A22 so that every other light emitting elements 3 are collected in the same division region in both the x direction and the y direction. The light emitting elements 3 included in the middle region A2 are arranged in the division regions A31, A32, A41, and A42 so that every other light emitting elements 3 are collected in the same division region in both the x direction and the y direction. The light emitting elements 3 included in the middle region A3 are arranged in the division regions A13, A14, A23, and A24 so that every other light emitting elements 3 are collected in the same division region in both the x direction and the y direction. The light emitting elements 3 included in the middle region A4 are arranged in the division regions A33, A34, A43, and A44 so that every other light emitting elements 3 are collected in the same division region in both the x direction and the y direction. Thus, the arrangement of the light emitting elements 3 in the display 1bi according to the present modification illustrated in FIG. 14 is obtained.

In the present modification, a division region group Gr1 includes the division regions A11, A12, A21, and A22. A division region group Gr2 includes the division regions A31, A32, A41, and A42. A division region group Gr3 includes the division regions A13, A14, A23, and A24. A division region group Gr4 includes the division regions A33, A34, A43, and A44. Thus, the division regions that belong to the same group are arranged adjacent to each other.

Fifth individual lenses 2e, second individual lenses 2b, third individual lenses, and sixth individual lenses are respectively arranged so as to correspond to the division regions that belong to the division region group Gr1, the division regions that belong to the division region group Gr2, the division regions that belong to the division region group Gr3, and the division regions that belong to the division region group Gr4. According to the present modification, the display images may be formed in a manner similar to that in the present embodiment.

As long as the division regions which display images that form each display image are dispersed over the display and the images displayed in the division regions are combined together to form the display image by the focusing effect of the lens, the method for dividing the basic region into the middle regions and dividing each middle region into the division regions and the method for arranging the light emitting elements are not limited to the method according to the present embodiment, and other methods may instead be used.

The individual lenses corresponding to the division regions that belong to the same division region group may be arranged adjacent to each other so as to correspond to the arrangement of the division regions illustrated in FIG. 14. In this case, the positions of the virtual images can be adjusted by changing the positional relationship between the images displayed in the division regions and the individual lenses.

Figure 15:
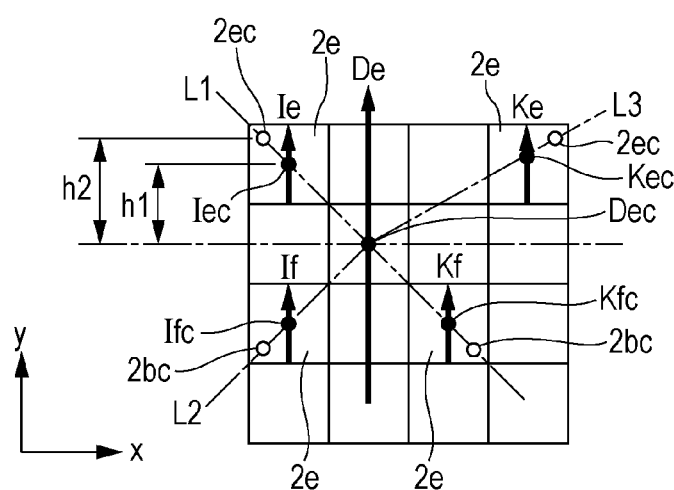
FIG. 15 illustrates the positional relationship between images displayed in division regions, individual lenses, and display images in an image display device according to another modification.

In addition, as illustrated in FIG. 15, the division regions may be arranged such that some of the division regions that belong to the division region group Gr1, for example, are arranged so as to have a single division region disposed therebetween in the x direction and the other division regions have two division regions disposed therebetween in the x direction, and the fifth individual lenses 2e may be arranged so as to correspond to the thus-arranged division regions. In this case, when the fifth individual lens 2e corresponding to an image Ke, the image Ke, and a display image De are viewed along an optical axis from the side at which the fifth individual lenses 2e are located, the fifth individual lens 2e corresponding to the image Ke is disposed such that the center 2ec of the fifth individual lens 2e, the center Kec of the image Ke, and the center Dec of the display image De are arranged on a straight line L3.

Third Embodiment

Figure 16:
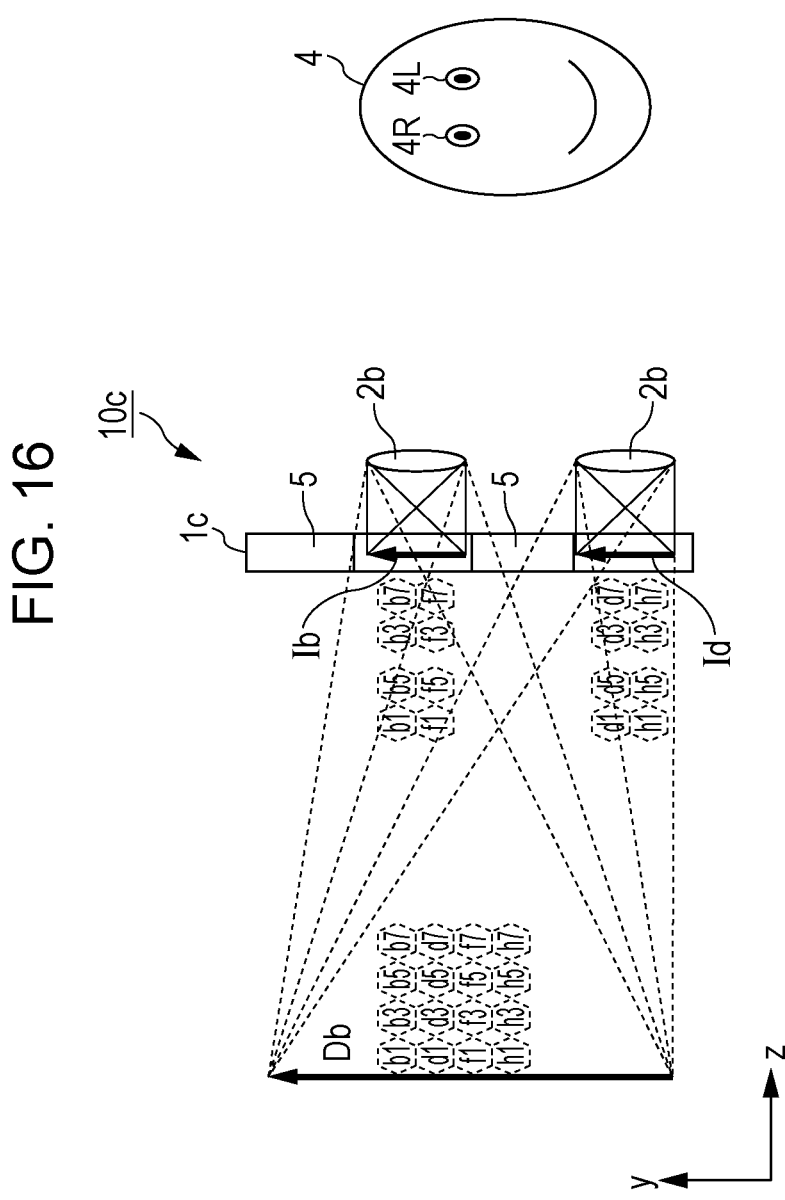
FIG. 16 is a sectional view schematically illustrating the structure of an image display device according to a third embodiment, the positional relationship between a display, individual lenses, and a display image, and optical paths.
Figure 17:
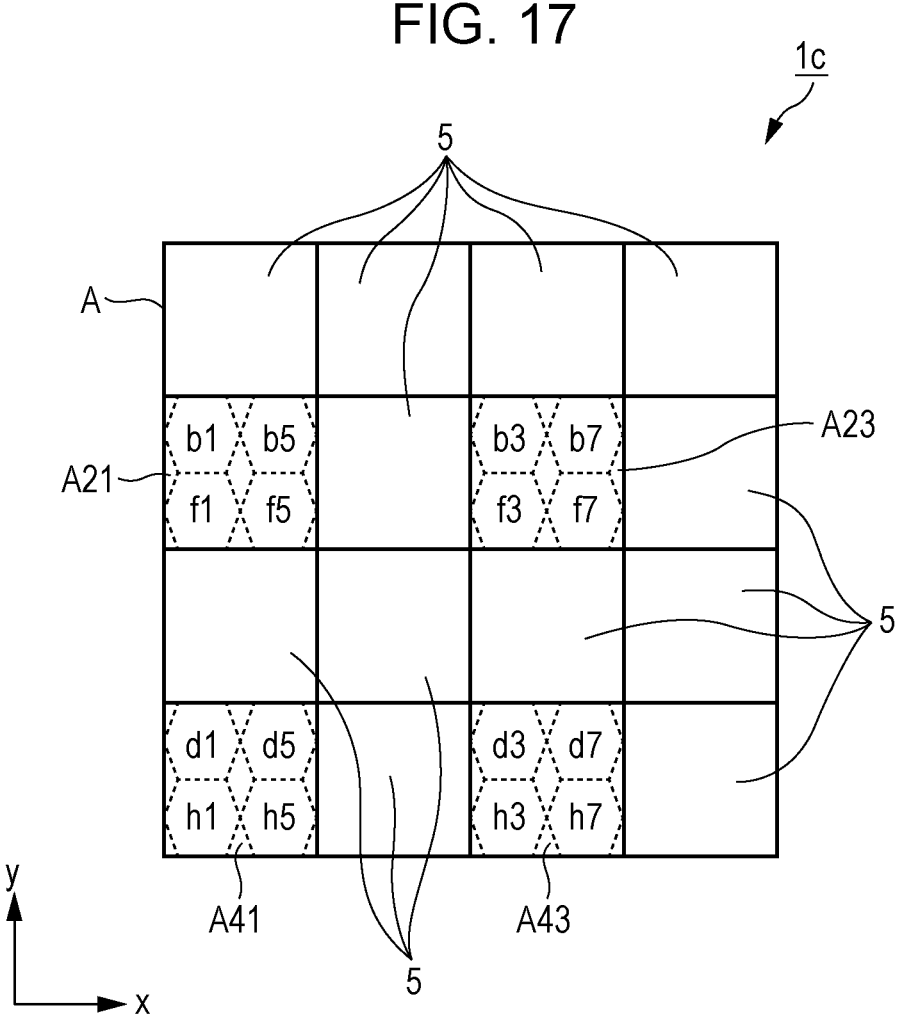
FIG. 17 schematically illustrates an arrangement of light emitting elements included in the display according to the third embodiment.

An image display device 10c according to a third embodiment will now be described. The structure of the image display device 10c is similar to the structure of the image display device 10b according to the second embodiment unless otherwise specified. As illustrated in FIG. 16, a display 1c according to the present embodiment includes transparent portions 5 that are disposed between division regions and that allow light to pass therethrough in a thickness direction of the display 1c. Second individual lenses 2b are arranged so as to correspond to division regions A21, A23, A41, and A43. However, no individual lenses are provided for the other division regions. The display 1c is, for example, a transmissive transparent display. As illustrated in FIG. 17, the display 1c functions as a light emitting unit in the division regions A21, A23, A41, and A43, but is transparent in other regions.

In the present embodiment, a display image Db can be formed by the division regions A21, A23, A41, and A43 and the second individual lenses 2b. In addition, the user can visually recognize the background of the display Ic, that is, the sight of a region behind the display Ic, through the transparent portions 5. Even when light is emitted from the division regions A21, A23, A41, and A43, since ¾ of the area of the basic region is transparent, the user can visually recognize the background of the display 1c, that is, the sight of a region behind the display Ic. In addition, by adjusting the ratio between the area of the division regions from which light can be emitted and the area of the transparent portions, the ratio between the amount of light of the display image and the amount of light of the background behind the display can be adjusted. Accordingly, an eyeglass-type image display device, for example, may be provided and an image, character information, etc., may be displayed such that they are superposed on the surrounding scenery.

In an eyeglass-type image display device including the display 1c, division regions for which imaging locations are far are preferably arranged in an upper region of the glasses, and division regions for which imaging locations are close are preferably arranged in a lower region of the glasses, as in bifocal glasses. In a field-glass-type image display device including the display Ic, division regions for which imaging locations are far may be arranged in an outer region of the glasses, and division regions for which imaging locations are close may be arranged in an inner region of the glasses. Thus, mismatch between the focusing and the convergence of both eyes can be alleviated.

Fourth Embodiment

Figure 18:
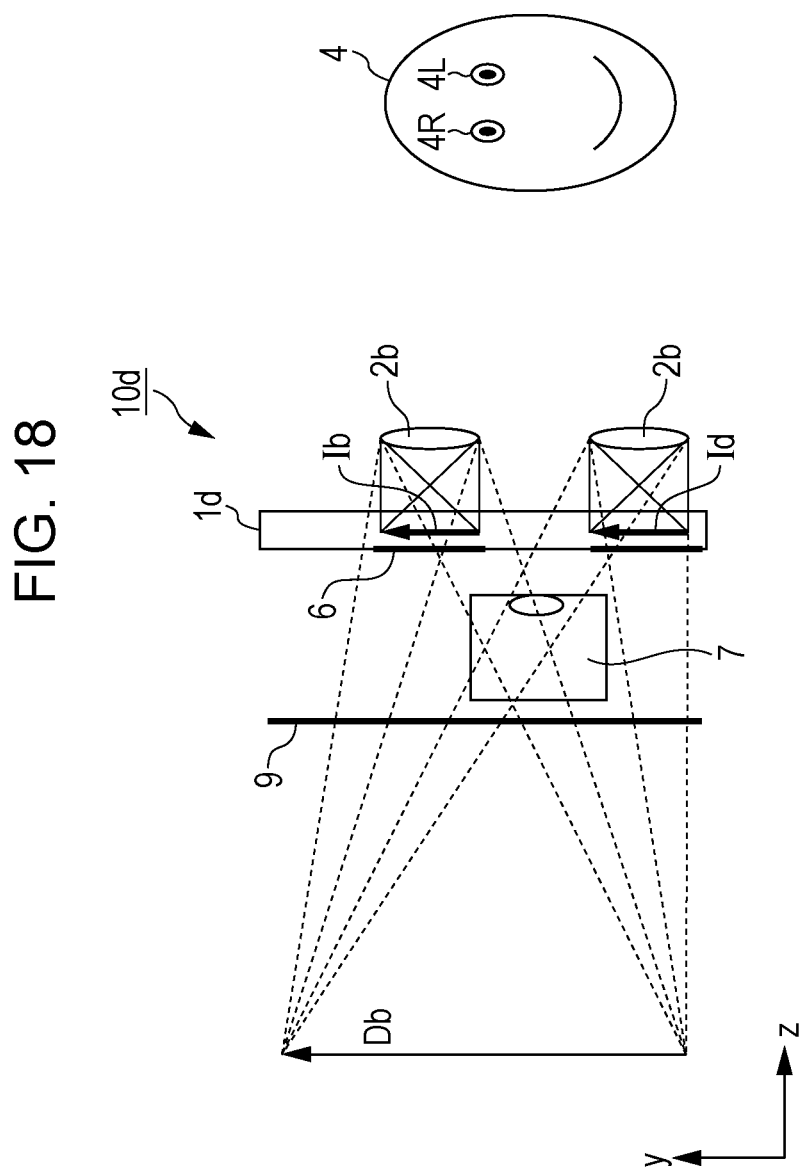
FIG. 18 is a sectional view schematically illustrating the structure of an image display device according to a fourth embodiment, the positional relationship between a display, individual lenses, and a display image, and optical paths.

An image display device 10d according to a fourth embodiment will now be described. The structure of the image display device 10d is similar to the structure of the image display device 10b according to the second embodiment unless otherwise specified. As illustrated in FIG. 18, the image display device 10d includes a camera 7 and a light shielding wall 9. The camera 7 is disposed between division regions. The light shielding wall 9 is disposed behind the camera 7.

Figure 19:
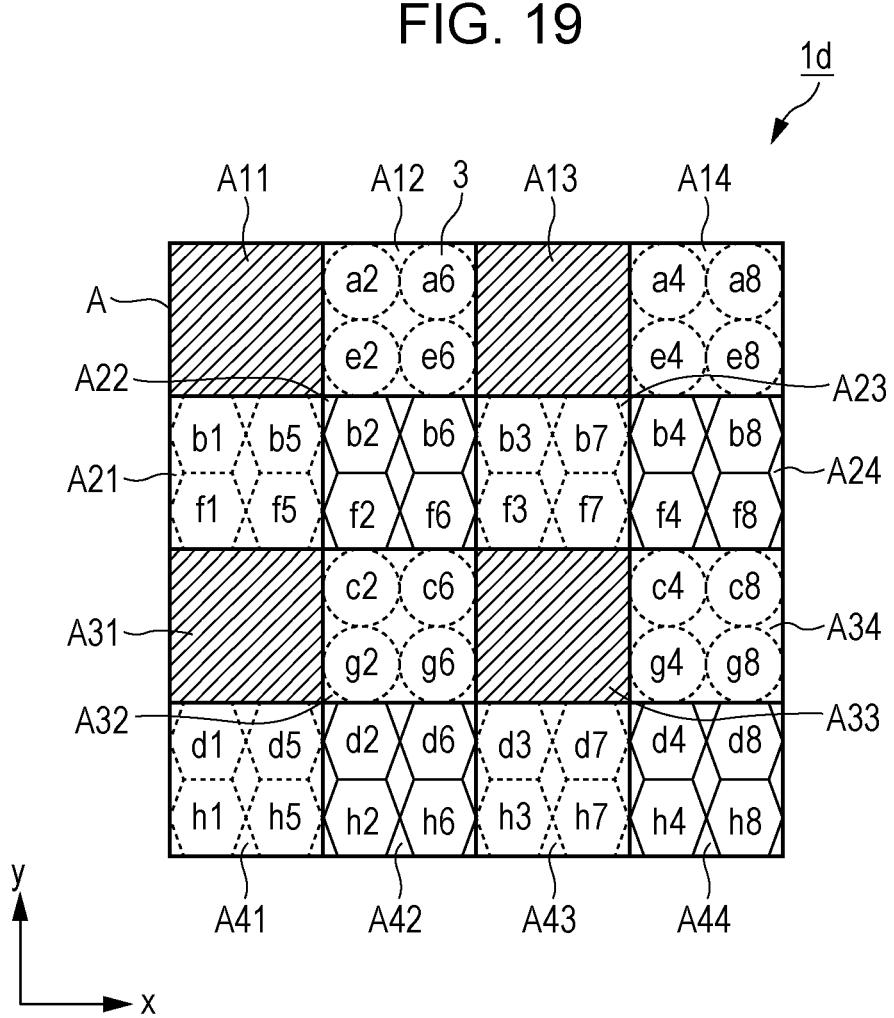
FIG. 19 schematically illustrates an arrangement of light emitting elements included in the display according to the fourth embodiment.

As illustrated in FIG. 19, in the display 1d, no fifth individual lenses 2e are disposed at positions corresponding to division regions A11, A13, A31, and A33, and second individual lenses 2b and other individual lenses are arranged so as to correspond to the other division regions. The display 1d is, for example, a transmissive transparent display, and portions corresponding to the division regions A11, A13, A31, and A33 are transparent. The other division regions function as light emitting units. A reflective layer 6 is formed on the back surface of the display 1d in the division regions other than the division regions A11, A13, A31, and A33 to increase the light emission efficiency.

The camera 7 is disposed behind the display 1d at a position corresponding to one of the division regions A11, A13, A31, and A33. The camera 7 captures an image of an object behind the display 1d, for example, a person in front of the display 1d. Human eyes 4R and 4L cannot recognize the camera 7 because of the darkroom effect caused by the light shielding wall 9. The division regions A21, A23, A41, and A43 display, for example, images for allowing the second individual lenses 2b to form an image captured by the camera 7 as a display image Db.

The human eyes 4R and 4L do not recognize the camera 7, and focus on the display image Db. Therefore, the eyes 4R and 4L are in a state such that they look forward into the distance, that is, such that the pupils are not shifted toward each other. Accordingly, a situation similar to that in which people look into a mirror can be reproduced. Since the display image can be formed at different positions in the thickness direction of the display, the position of the display image can be easily switched.

Fifth Embodiment

Figure 20:
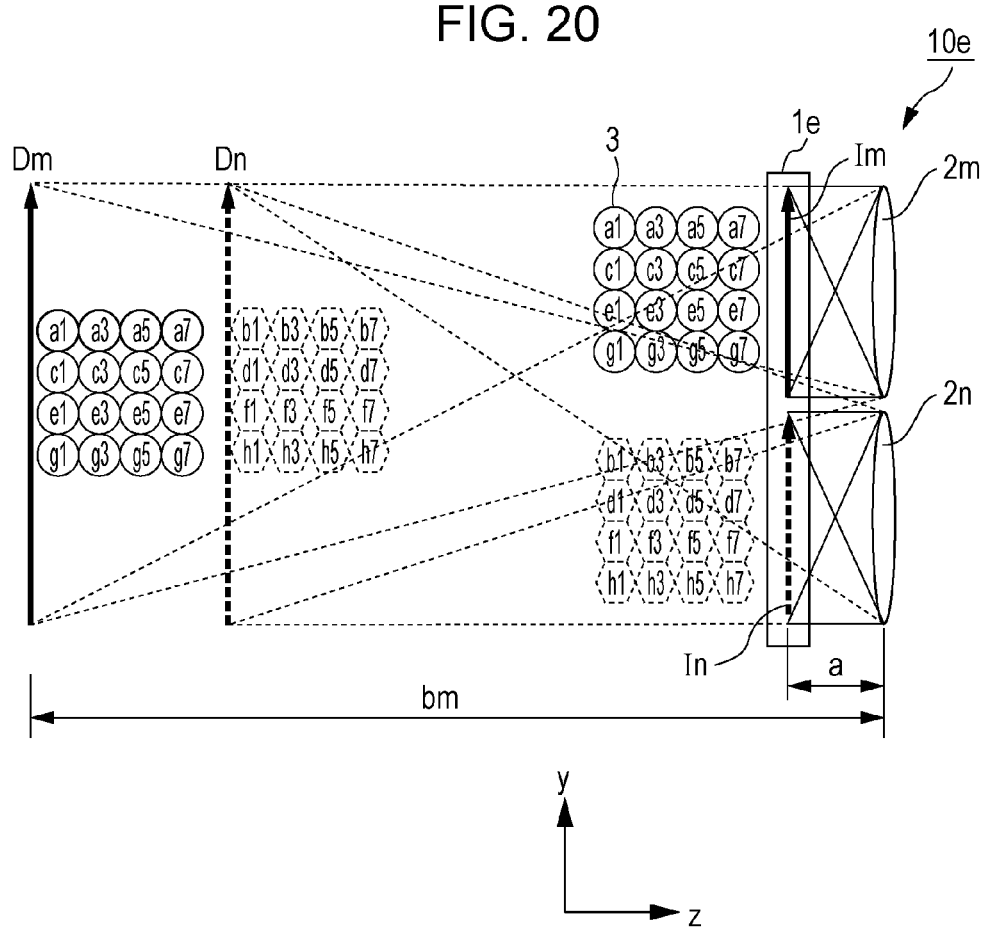
FIG. 20 is a sectional view schematically illustrating the structure of an image display device according to a fifth embodiment, the positional relationship between a display, individual lenses, and display images, and optical paths.
Figure 21:
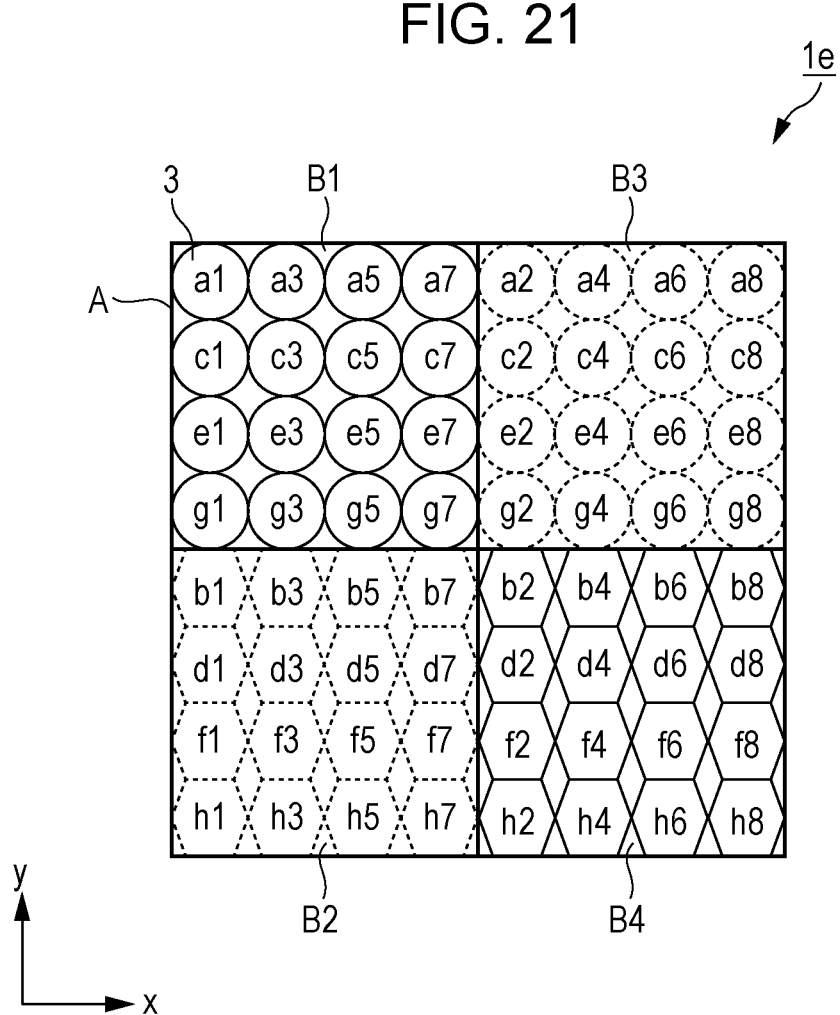
FIG. 21 schematically illustrates an arrangement of light emitting elements included in the display according to the fifth embodiment.
Figure 22:
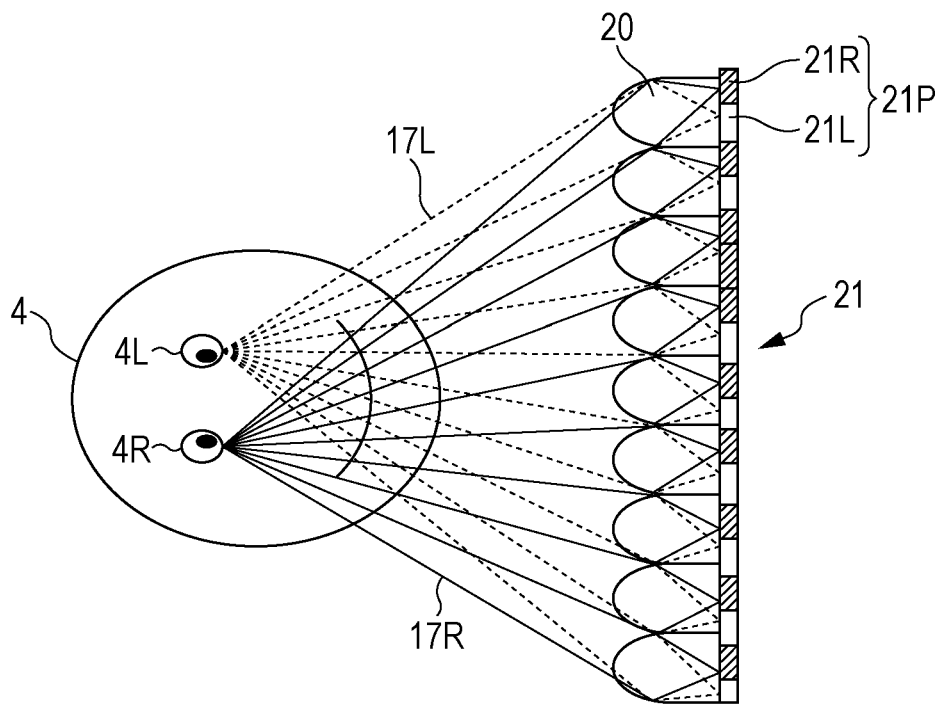
FIG. 22 is a diagram illustrating the structure of an image display device according to the related art and optical paths.

An image display device 10e according to a fifth embodiment will now be described below. As illustrated in FIG. 20, the image display device 10e includes a display 1e, a first lens 2m, a second lens 2n, a third lens (not shown), and a fourth lens (not shown). As illustrated in FIG. 21, in the display 1e, a basic region A including light emitting elements 3 arranged in an 8×8 matrix pattern is divided into a division region B1, a division region B2, a division region B3, and a division region B4, each of which includes light emitting elements 3 arranged in a 4×4 matrix pattern, so as to correspond to the arrangement of the middle regions A1, A2, A3, and A4 illustrated in FIG. 3B.

The first lens 2m, the second lens 2n, the third lens, and the fourth lens are located near a surface of the display 1e. In addition, the first lens 2m, the second lens 2n, the third lens, and the fourth lens are arranged at positions corresponding to the division region B1, the division region B2, the division region B3, and the division region B4, respectively. The first lens 2m, the second lens 2n, the third lens, and the fourth lens form display images for the division regions B1, B2, B3, and B4, respectively, by focusing images displayed in the division regions B1, B2, B3, and B4 as virtual or real images. For example, the image display device 10e forms a display image Dm by causing the first lens 2m to focus an image Im displayed in the division region B1 as a virtual image. The image display device 10e also forms a display image Dn by causing the second lens 2n to focus an image In displayed in the division region B2 as a virtual image.

The first lens 2m, the second lens 2n, the third lens, and the fourth lens corresponding to the division regions B1, B2, B3, and B4, respectively, have different focal lengths so that the display images corresponding to the division regions are formed at different positions in the thickness direction of the display 1e. For example, the first lens 2m forms the display image Dm, and the second lens 2n forms the display image Dn. Thus, a plurality of display images can be formed at different positions in the thickness direction of the display 1e. The first lens 2m and the second lens 2n may be arranged so that the display image Dm and the display image Dn overlap if translated in the thickness direction of the display 1e. The first lens 2m, the second lens 2n, the third lens, and the fourth lens corresponding to the division regions B1, B2, B3, and B4, respectively, may be located at different distances from the display 1e so that the display images corresponding to the division regions are formed at different positions in the thickness direction of the display 1e.

In an image display device according to an aspect of the present disclosure, since a display is divided into a plurality of division regions, the division regions are smaller than the display. With the image display device according to the aspect of the present disclosure, a lens is arranged so as to correspond to the division regions. Therefore, the focal length of the lens can be reduced in accordance with the size of the division regions. As a result, according to the aspect of the present disclosure, the image display device can be reduced in size.

An image display device according to the present disclosure is suitable for use as, for example, a liquid crystal display, an organic EL display, or an eyeglass-type image display device.

While the present disclosure has been described with respect to preferred embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. An image display device comprising:
a display including a plurality of light emitting elements that are two-dimensionally arranged, the plurality of light emitting elements being divided into a plurality of division regions, each of which includes more than one of the plurality of light emitting elements; and
a lens that is located near a surface of the display so as to correspond to the division regions and that forms a display image by focusing each of images displayed in the respective division regions as a real image or a virtual image so that the focused images overlap on a same image plane,
wherein the lens focuses each of images formed by the plurality of light emitting elements in one of the plurality of division regions between images formed by two adjacent light emitting elements in another one of the plurality of division regions.

2. The image display device according to claim 1, wherein the plurality of division regions display the respective images so that the images displayed in the respective division regions interpolate each other to form the display image.

3. The image display device according to claim 2, wherein each of the plurality of division regions displays an image obtained by partially thinning out the display image.

4. The image display device according to claim 1, wherein the display includes a plurality of division region groups, each of which includes more than one of the plurality of division regions, the images displayed in the division regions that belong to a same division region group being focused by the lens so as to overlap on the same image plane and form the display image,
wherein the lens includes a plurality of individual lenses that are arranged so as to correspond to the respective division region groups, and
wherein the individual lenses corresponding to the respective division region groups have different focal lengths or are located at different distances from the display so that the display images corresponding to the respective division region groups are formed at different positions in a thickness direction of the display.

5. The image display device according to claim 4, wherein the individual lenses are arranged so that the display images corresponding to the respective division region groups and formed by the respective individual lenses overlap if moved in the thickness direction of the display, and
wherein light emission states of the light emitting elements that correspond to a region in which the display images overlap if moved in the thickness direction of the display are associated with each other.

6. The image display device according to claim 1, wherein the display includes a basic region including the plurality of division regions, and
wherein, when a distance between the display and the lens is Ra and a distance between the display image and the lens is Rb, Rb/Ra is determined so that an area of the display image is substantially equal to an area of the basic region.

7. The image display device according to claim 1, wherein the display includes a liquid crystal layer that is disposed between the lens and the images displayed in the respective division regions and that has a refractive index that varies in response to a voltage applied to the liquid crystal layer.

8. The image display device according to claim 1, wherein the display includes a plurality of color filters having different colors, and
wherein one of the color filters having a single color is arranged in each division region.

9. The image display device according to claim 1, wherein the display includes a transparent protective substrate arranged at a forefront of the display, and
wherein the image display device further comprises convex lenses arranged so as to be in contact with the protective substrate and correspond to the respective division regions.

10. The image display device according to claim 1, wherein the display includes a transparent portion disposed between two of the division regions that are adjacent to each other, the transparent portion allowing light to pass therethrough in a thickness direction of the display.

11. The image display device according to claim 1, further comprising:
a camera disposed between two of the division regions that are adjacent to each other; and
a light shielding wall disposed behind the camera,
wherein the plurality of division regions display images for allowing the lens to display an image captured by the camera as the display image.

12. An image display device comprising:
a display including a plurality of light emitting elements that are two-dimensionally arranged, the plurality of light emitting elements being divided into a plurality of division regions, each of which includes more than one of the plurality of light emitting elements; and lenses that are located near a surface of the display so as to correspond to the respective division regions, each lens forming a display image for the corresponding division region by focusing an image displayed in the corresponding division region as a real image or a virtual image, wherein the lenses corresponding to the respective division regions have different focal lengths or are located at different distances from the display so that the display images corresponding to the respective division regions are at different positions in a thickness direction of the display.

13. An image display device comprising:

a display including a plurality of light emitting elements that are two-dimensionally arranged, the plurality of light emitting elements being divided into a plurality of division regions, each of which includes more than one of the plurality of light emitting elements; and a lens that is located near a surface of the display so as to correspond to the division regions and that forms a display image by focusing each of images displayed in the respective division regions as a real image or a virtual image so that the focused images overlap on a same image plane, wherein the display includes a basic region including the plurality of division regions, and wherein, when a distance between the display and the lens is Ra and a distance between the display image and the lens is Rb, Rb/Ra is determined so that an area of the display image is substantially equal to an area of the basic region.

14. An image display device comprising:

a display including a plurality of light emitting elements that are two-dimensionally arranged, the plurality of light emitting elements being divided into a plurality of division regions, each of which includes more than one of the plurality of light emitting elements;

a lens that is located near a surface of the display so as to correspond to the division regions and that forms a display image by focusing each of images displayed in the respective division regions as a real image or a virtual image so that the focused images overlap on a same image plane;

a camera disposed between two of the division regions that are adjacent to each other; and a light shielding wall disposed behind the camera, wherein the plurality of division regions display images for allowing the lens to display an image captured by the camera as the display image.

* * * * *